(12) United States Patent
Lang et al.

(10) Patent No.: US 11,390,495 B2
(45) Date of Patent: Jul. 19, 2022

(54) LINE CABLE AND POWER SUPPLY SYSTEM

(71) Applicant: Conductix-Wampfler GmbH, Weil am Rhein (DE)

(72) Inventors: Dietmar Lang, Schliengen (DE); Martin Nöltner, Lörrach-Haagen (DE); Bernd Maier, Schliengen (DE); Frank Kreiter, Malsburg (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 553 days.

(21) Appl. No.: 16/478,239

(22) PCT Filed: May 3, 2018

(86) PCT No.: PCT/EP2018/061360
§ 371 (c)(1),
(2) Date: Jul. 16, 2019

(87) PCT Pub. No.: WO2018/206394
PCT Pub. Date: Nov. 15, 2018

(65) Prior Publication Data
US 2019/0359454 A1 Nov. 28, 2019

(30) Foreign Application Priority Data
May 9, 2017 (DE) .................... 10 2017 109 985.9

(51) Int. Cl.
*H02G 15/007* (2006.01)
*B66C 13/12* (2006.01)
(Continued)

(52) U.S. Cl.
CPC ........... *B66C 13/12* (2013.01); *H01R 13/595* (2013.01); *H02G 11/003* (2013.01); *H02G 11/006* (2013.01); *H02G 15/007* (2013.01)

(58) Field of Classification Search
CPC .. H02G 15/007; H02G 11/006; H02G 11/003; H01R 13/595
(Continued)

(56) References Cited

U.S. PATENT DOCUMENTS 1,964,350 A 6/1934 Greene
4,743,711 A * 5/1988 Hoffman .............. H01B 7/0072
174/109
(Continued)

FOREIGN PATENT DOCUMENTS

CN 204882956 U 12/2015
DE 2308316 A1 9/1973
(Continued)

OTHER PUBLICATIONS

International Preliminary Report on Patentability, dated Nov. 12, 2019, with Written Opinion (English translation) for PCT/EP2018/061360, filed May 3, 2018.
(Continued)

*Primary Examiner* — Sherman Ng
(74) *Attorney, Agent, or Firm* — Paul D. Bianco; Gary S. Winer; Fleit Intellectual Property Law

(57) ABSTRACT

A line cable comprises one or more conductors for transmitting electrical power and/or data and an elongate supporting element. A related power supply system for supplying electrical power and/or data to a movable electrical load via cables comprises at least one feed device and a connecting element, which can be connected to the feed device, of a line cable of the load. The line cable can be output or retrieved from a reservoir, which is carried along by the load, in accordance with a distance between the reservoir and the feed device. A connecting element for connection to a connection of a feed device for electrical power and/or data is arranged at one end of the line cable. The supporting
(Continued)

element can be connected to the connecting element in a force-fitting and/or interlocking manner for the purpose of transmitting longitudinal tensile forces.

20 Claims, 20 Drawing Sheets

(51) Int. Cl.
*H01R 13/595* (2006.01)
*H02G 11/00* (2006.01)

(58) Field of Classification Search
USPC ........................................................ 174/70 R
See application file for complete search history.

(56) References Cited

U.S. PATENT DOCUMENTS

| | | | | |
|---|---|---|---|---|
| 5,902,962 | A | * | 5/1999 | Gazdzinski .......... G02B 6/4416 73/866 |
| 2008/0057770 | A1 | | 3/2008 | Caveney et al. |
| 2010/0055970 | A1 | | 3/2010 | Elsmark et al. |
| 2014/0193119 | A1 | * | 7/2014 | Isenhour .............. G02B 6/4214 156/221 |
| 2018/0208443 | A1 | | 7/2018 | Hermey et al. |

FOREIGN PATENT DOCUMENTS

| | | |
|---|---|---|
| DE | 2816081 A1 | 10/1978 |
| DE | 202006009750 U1 | 10/2007 |
| DE | 202007014219 U1 | 2/2008 |
| DE | 202015004918 U1 | 10/2016 |
| JP | H05203815 A | 8/1993 |
| WO | 2003047060 A1 | 6/2003 |
| WO | 2011006154 A1 | 1/2011 |
| WO | 2014131826 A1 | 9/2014 |

OTHER PUBLICATIONS

International Search Report dated Jul. 26, 2018 for PCT/EP2018/061360 filed May 3, 2018.
Written Opinion for PCT/EP2018/061360 filed May 3, 2018.
Result of examination report for German Application No. 10 2017 109 985.9 filed May 9, 2017.

* cited by examiner

LINE CABLE AND POWER SUPPLY SYSTEM

FIELD OF THE INVENTION

The present invention relates to a line cable and a power supply system.

BACKGROUND OF THE INVENTION

DE 20 2006 009 750 U1 discloses a container-loading crane comprising a line cable drum for winding and unwinding a line cable. The line cable is connected to a stationary feeding point, relative to which the loading crane moves in the longitudinal direction. Depending on the position the loading crane has been moved to, the line cable is wound around or unwound from the line cable drum. The disadvantage is that the conductor crane is fixedly confined to a path, along which it moves back and forth in the longitudinal direction. For this reason, for a long time cranes have been mounted on rails and rigidly connected to a feeding point.

Because cranes are increasingly intended to move not only along a single container-stacking area, but also between different stacking areas that are laterally and longitudinally offset relative to one another, they can no longer be rigidly connected to a single feeding point dedicated to a particular container-stacking area. Instead, it must be possible to connect them flexibly to different feeding points.

To makes this possible, WO 2014/131826 A1 proposes a device for automatically connecting a crane to an electrical power supply source, wherein the ends of the connecting line, which is carried along on the crane, are fitted with a plug that is plugged into a docking station that is buried in a hole in the ground. The docking station comprises two vertical rods spaced at a distance from each other and that enter the guide openings of the plug where the plug is inserted into the docking station. In addition, to secure the plug to the docking station, an automatic locking mechanism is disposed in the hole in the ground.

The line cable projects vertically in the upward direction from the docking station and, as the crane moves away from the docking station, comes to rest on the ground in the longitudinal direction next to the crane. The line cable should be bent as smoothly as possible, and the bending radius of the line cable should not fall below a specified minimum. In addition, to avoid damage to the electrical lines inside the line cable when the cable is pulled or wound up, a strain relief is provided. To this end, the prior-art device comprises an additional support means for the line cable, around which support means the line cable extending from the plug in the ground is deposited. The support means for the line cable, together with the plug, is positioned on the docking station. The disadvantage is that it either requires a worker to place the line cable around the support means for the line cable or the line cable must already have been wound around the support means. Furthermore, the support means for the line cable is technically complex as well as large and heavy, which requires that the device for placing and holding the plug and the support means for the line cable must be constructed so as to be sufficiently robust and powerful. In addition, the overall unit that has to be carried along on the crane is heavy and thus increases the weight of the crane, which requires a more powerful drive system for the crane. Furthermore, this unit is large, requiring much installation space on the crane and increasing the width of the crane.

US 2010/0055970 A1 relates to a connector plug for a multi-conductor cable having an axial load-transferring non-conducting tensile string, with the connector plug including a casing that carries a number of contact elements attached to conductors of the cable for engaging corresponding contact elements connected to a matching jack. The tensile string is anchored relative to the casing via an annular element mounted at the end of the cable. A transverse pin is firmly attached to the tensile string of the cable and positively engages the annular element. The annular element has a rim portion with an outer diameter that is larger than an outer cross-sectional dimension of the cable so as to engage an internal shoulder on the casing and enable transfer of axial load from the tensile string of the cable to the casing and further to a connected matching jack via the transverse pin and the annular element.

WO 2011/006154 A1 relates to a high-strength electrical connector comprising an outer cylindrical rigid support cover that is open at both ends and preferably. A first electrical lead extends through a tension bushing attached to one end of the support cover. A mating receptacle through which a second electrical lead passes is securely attached to a second oppositely disposed end of the support cover. The electrical connection between the ends of the first and second electrical leads is established within the support cover. Securely attaching the two leads together within the support cover directs axial and transverse forces, which are exerted on the first electrical lead, through the support cover, thus bypassing the electrical connection.

U.S. Pat. No. 1,964,350 B relates to electrical line couplings that firmly anchor lead-in wires in attaching or coupling elements independently of screw connections. Any pull exerted on the wires is transmitted to the attaching elements without exerting stress on the screw connections.

DE 20 2007 014 219 U1 relates to an electrical line for supplying electric power to electrical instruments, comprising a line element surrounded by a casing for conducting electric power and at least one strain relief means surrounded by a casing and not conducting electric power, which strain relief means is to be affixed to a support structure for relieving strain on the line element. A possibility of how to readjust the tension of the strain relief means is not disclosed.

WO 2003/047060 A1 relates to a device for winding and unwinding power conductors, which device is installed in a vehicle, one end of which extractable conductor, during stops, can be connected to stationary points of power supply networks.

DE 2 308 316 A relates to a circular-type electric plug-in connector, comprising a plug that can be inserted into a plug-in socket into which it can be detachably locked by means of a bayonet lock, with the connector halves of this plug comprising each a metal sleeve having insulating elements attached therein and in which the contact elements serving to establish a mechanical and electrical connection are disposed.

DE 28 16 081 A1 relates to an electric plug-in connector having resilient pressure contacts, which plug-in connector solves the problem of establishing an electrical connection, comprising a plug having preferably fixed contact pins and a socket having resiliently moving pressure contacts and a safety disk, which disk, in its resting position and in its contact position, can be locked or retained at least in part by the resilient effect of the movable contacts of the plug. Locking the disk is ensured at least in part by projecting insulating elements that are connected to or associated with the movable contacts and urged by the resilient means of the latter to engage in the resting position and the contact position in separate recesses formed by the disk, with the recesses, which determine the contact position, being substantially coaxial with the openings of the disk and with the surfaces and shapes of the projecting elements and the recesses being chosen to suitably cooperate and to allow these elements to withdraw from or engage in the recesses by a simple rotation of the disk at the beginning and at the end of the operation, respectively.

US 2008/0057770 A1 relates to a push-pull plug having an outer housing that can be moved forwardly and backwardly along a plug housing. When the outer housing is in its forward position, a latch arm is in an upward or mated position and the plug remains mated to a jack when the plug is inserted into the jack. When the outer housing is moved backwardly, cam recesses on the outer housing push the cam followers on the latch arm downwardly, which causes the latch arm and the latch to be moved into a downward or unmated position. The plug can then be removed from the jack as the outer housing is pulled.

SUMMARY OF THE INVENTION

Thus, one aspect of the present invention is to eliminate the disadvantages listed above and to make it easier to establish an automatic connection of a line cable to a feed device disposed on the ground and, in particular, to also make available a strain-relieving configuration that protects the power and/or data conductors of the line cable. Preferably, it should also be possible to guide and wind up the line cable in a manner that protects the cable, in particular, to reduce the risk that the line cable buckles or is excessively bent when the electrical load is moved.

The present invention relates to a line cable and a power supply system.

Further advanced modifications and embodiments of the invention are also disclosed.

According to the present invention, a line cable, as named above, is characterized in that at one end of the line cable, a connecting element for connection to a connector of a feed device for electrical power and/or data is disposed, wherein the supporting element can be connected to the connecting element in a force-fitting and/or interlocking manner for the purpose of transmitting longitudinal tensile forces.

The supporting element can be designed to serve as strain relief in order to keep the tensile forces acting upon the conductors as low as possible, specifically while an electrical load that is connected to the pull cable is moved. In addition, the supporting element can be flexible and, more specifically, comprise an aramid rope or a wire rope. Preferably, the line cable comprises an outer casing that surrounds the conductors and the supporting element, with the possibility of preferably including an additional strain relief means, such as specifically a braided or woven fabric that is embedded in the outer casing. The conductors preferably comprise at least one phase conductor for the transmission of electrical power, at least one protective conductor, and/or one or more electrical and/or optical data transmission conductors. In addition, the area between the conductors and the supporting element can be filled with a filling material, specifically an elastic filling material. Furthermore, the line cable can comprise molded parts that retain the conductors and the supporting element in predefined positions relative to one another.

According to a useful embodiment, the connecting element can comprise a supporting frame that can be connected to the supporting element in a force-fitting and/or interlocking manner. The supporting frame can also be detachably connected in a force-fitting and/or interlocking manner to the connector for the purpose of keeping the tension as far away as possible from the conductors in the line cable.

The supporting element can be attached to a tensioning bolt that, for tensioning the supporting element, is preferably attached to the connecting element so as to be capable of rotating about an axis of rotation extending at right angles to the longitudinal direction of the supporting element. In a useful advanced modification, the connecting element can comprise an anti-slip means for securing the tensioning bolt, and more specifically, the tensioning bolt for tensioning the supporting element can be designed so as to be capable of moving in its axial direction out of the anti-slip means against a return element, in particular a spring element, such as a cup spring or a spiral spring.

According to an operationally favorable embodiment, the connecting element can comprise latching elements, in particular latching openings, for a detachable force-fitting and/or interlocking connection to mating latching counter-elements disposed on the connector.

According to another favorable embodiment, the conductors of the line cable can be connected in a strain-relieving or strain-free manner to connector elements disposed in the connecting element. Furthermore, the connector elements can be floatingly mounted in at least one direction inside the connecting element. An advantage from the standpoint of manufacturing technology and operability can be achieved by disposing a plurality of connector elements on a shared connector support.

The connecting element can have a connecting plug opening for receiving the connector, with an automatically closing protective cover for closing the connecting plug opening preferably being disposed on the connecting element. In addition, centering elements, specifically centering bolts, which cooperate with the mating of centering elements, specifically centering openings, of the connector, can be disposed on the connecting element.

Disposed on the connecting element can be a gripping space for a gripping device of a connecting device to facility gripping of the connecting element. The gripping space can preferably comprise at least one centering funnel for at least one centering means of the gripping device or vice versa so as to be capable of holding the connecting element easily in a predefined desired position relative to the connector in the gripping device. According to an advanced modification, the narrower end of the centering funnel can be lengthened in the shape of a slot to form a centering slot.

According to the present invention, a power supply system as mentioned above is characterized in that a connecting device as described above and below is provided. The reservoir can preferably be a motor-driven cable drum, with the line cable preferably only being wound up one on top of the other, but not side by side. The line cable preferably can be paid out from top to bottom. Furthermore, a plug latching mechanism for latching the connecting element on the connector can be provided. In addition, a connecting device for connecting a connecting element of the line cable to a connector of the feed device can be provided. The laydown direction of the line cable can run from the feed device to the point at which the line cable exits from a cable guiding device that is disposed on the load, with the travel direction and the laydown direction preferably differing only slightly from each other, specifically no more than 15°.

BRIEF DESCRIPTION OF THE DRAWINGS

The invention will be described below based on detailed practical examples with reference to the accompanying drawings. These drawings show.

DETAILED DESCRIPTION OF THE INVENTION

Figure 1:
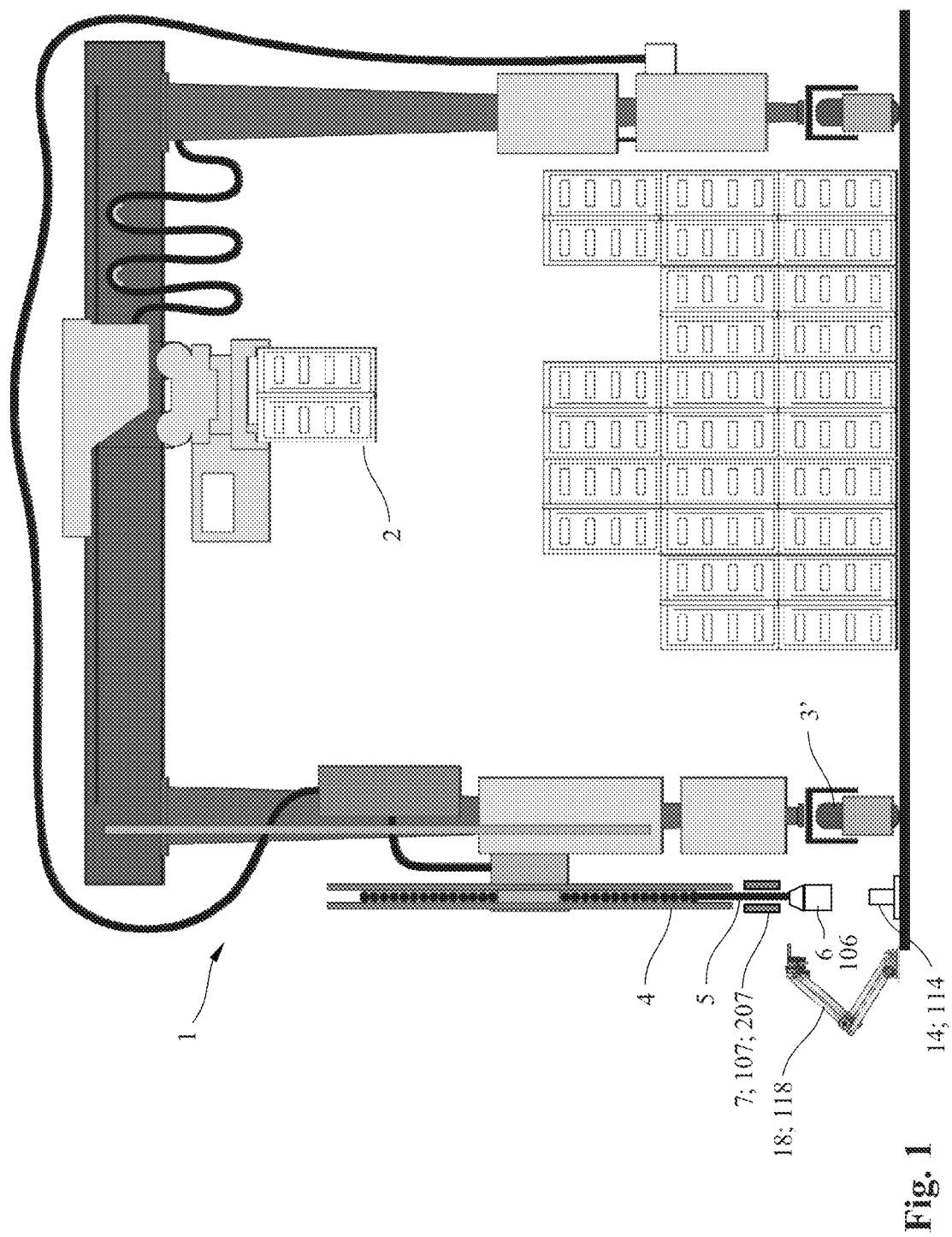
FIG. 1 a diagrammatic lateral view of a power supply system for a container crane.

FIG. 1 shows a crane 1 used for the transfer of containers 2 stored in a container stacking area, such as is used in large transfer facilities, specifically in ports. The crane 1 is capable of moving on wheels 3, 3' in a travel direction F in a traveling path next to the container stacking area, which traveling path as a rule runs parallel to the containers 2. As a rule, in transfer facilities, a plurality of such container stacking areas is arranged side by side and sometimes one behind the other, and the crane 1 as well as other cranes can be moved between the individual container stacking areas.

To supply electrical power to the crane 1 and to the electrical equipment installed thereon, e.g., the motors for lifting and moving the containers 2, and to the electrical drive systems of the wheels 3, 3', and/or optionally to transmit data from and to the crane 1, a line cable drum 4 is disposed on the outside of the crane 1, around and from which drum an electrical line cable 5 can be wound and unwound, respectively, in a laydown direction corresponding to the traveling path of the crane 1 in the travel direction F. As a rule, the laydown direction and the travel direction F are the same or differ only slightly from each other because the line cable 5 is preferably laid down parallel to the travel direction F. The line cable 5 is laid down along the traveling path of the crane 1, which traveling path along its length generally differs slightly from the ideal line that runs parallel to the containers 2. Thus, "parallel" here and hereinafter does not mean that the paths are mathematically parallel at each point of the travelling path, but that the line cable 5 is laid down next to the container stacking area within the limits of travel and laydown inaccuracies. This is known from the prior art.

A connecting element in the form of a connecting plug 6 and 106 is disposed on the freely downwardly suspended end of the line cable 5, which cable can be guided accurately and as free from tension as possible by means of a cable guiding device 7 and 107 disposed on the crane 1 for the purpose of laying down the cable on the ground and for rewinding it onto the cable drum 4.

Figure 2:
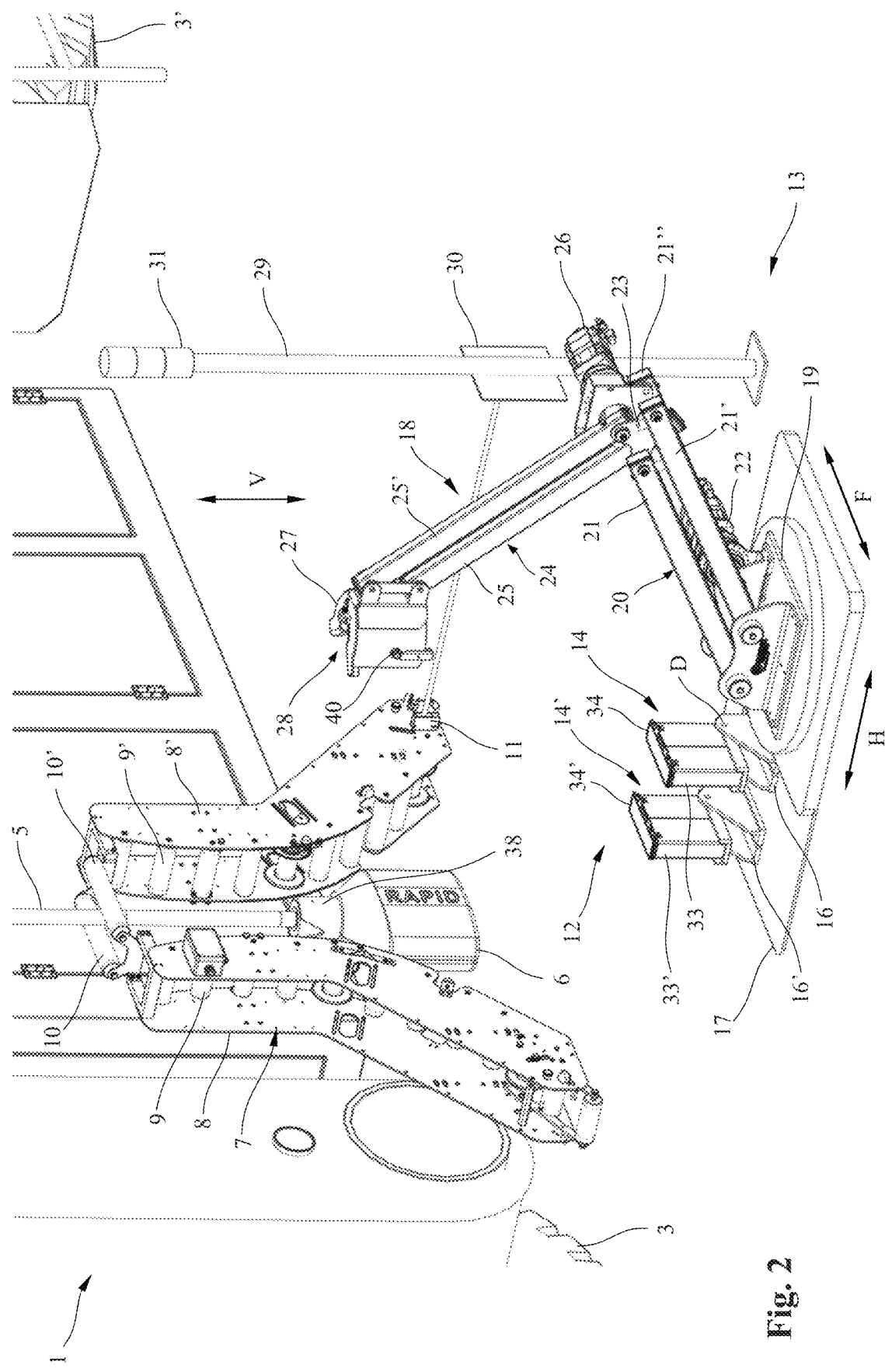
FIG. 2 a diagrammatic three-dimensional view of a section of FIG. 1 showing a first connecting device according to the present invention.

In the detailed diagrammatic three-dimensional view of the first practical example in FIG. 2, a section of the crane 1 and the wheels 3, 3' is once again shown from a diagonal side perspective. It also depicts details of the cable guiding device 7, by means of which the line cable 5 can be laid down on the ground accurately and with application of the lowest force and tension possible. The cable guiding device 7 comprises two oppositely lying roller bends 8, 8' that, in the travel direction F of the crane 1, are offset with respect to each other and that widen toward the bottom. In the roller bends 8, 8', a plurality of freely rotating longitudinal guide rollers 9, 9' is disposed, along which the line cable 5 can be guided with the lowest friction possible. In the lateral direction H at right angles relative to the travel direction F, the line cable 5 is guided by means of two lateral guide rollers 10, 10' that are disposed above the roller bends 8, 8' and that, in the present practical example, connect these roller bends, which is, however, not necessary. On the lower end of the roller bend 8' on the right in FIG. 2, a sensor unit 11 is disposed, the function of which will be explained later. It is, however, also possible to dispose the sensor unit 11 somewhere along the cable guiding device 7 or on the crane 1 and to connect it to the control unit without a cable.

To connect the connecting plug 6 to an electrical voltage supply source (not shown in detail in the drawing), a feed device 12 with a connecting device 13 disposed thereon is arranged in a stationary manner next to the traveling path of the container crane 1. In the case at hand, the feed device 12 comprises two connectors in the form of plug connectors 14, 14' that, by means of two connector members in the form of swivel plates 15, 15', are pivotably hinged in bearings 16, 16' about axes of rotation D, D' (see FIG. 7). The bearings 16, 16' are attached to the ground or, more specifically, to a mounting element, specifically a mounting plate 17, on the ground, which mounting plate in turn is generally attached to a fixed foundation. The function of the pivotable bearing will be explained in greater detail later with reference to FIG. 7. It is, however, also possible to dispose more or fewer plug connections on the feed device.

The connecting device 13 comprises a manipulator 18 that is designed to grasp and actively move the connecting plug 6 and to establish a connection between the connecting plug 6 and the plug connector 14. The manipulator 18 comprises a manipulator base 19, to which a lower manipulator arm 20 having lower sub-arms 21, 21', 21" are hinged, two of which are completely visible, and one is partially obscured as seen in FIGS. 2 to 6. The manipulator arm 20 can be moved by means of a manipulator drive mechanism 22 that rotates sub-arm 21" and preferably also sub-arm 21'.

At the other upper end, the lower sub-arms 21, 21', 21" are subsequently connected to a cross-shaped connecting piece 23 in such a manner that the sub-arms 21, 21', 21" form a first guide in the shape of a parallelogram. Connected thereto is an upper manipulator arm 24 that, together with two upper manipulator arms 25, 25', is pivotably hinged to two other hinge connectors of the connecting piece 23, which are crosswise offset relative to the hinge connectors of the lower sub-arms 21, 21', 21". At their upper front ends, the manipulator arms 25, 25' are in turn connected to each other in the shape of a parallelogram. The upper sub-arm 25' can be rotated about its lower hinge axes via an upper manipulator drive mechanism 26.

Figure 4:
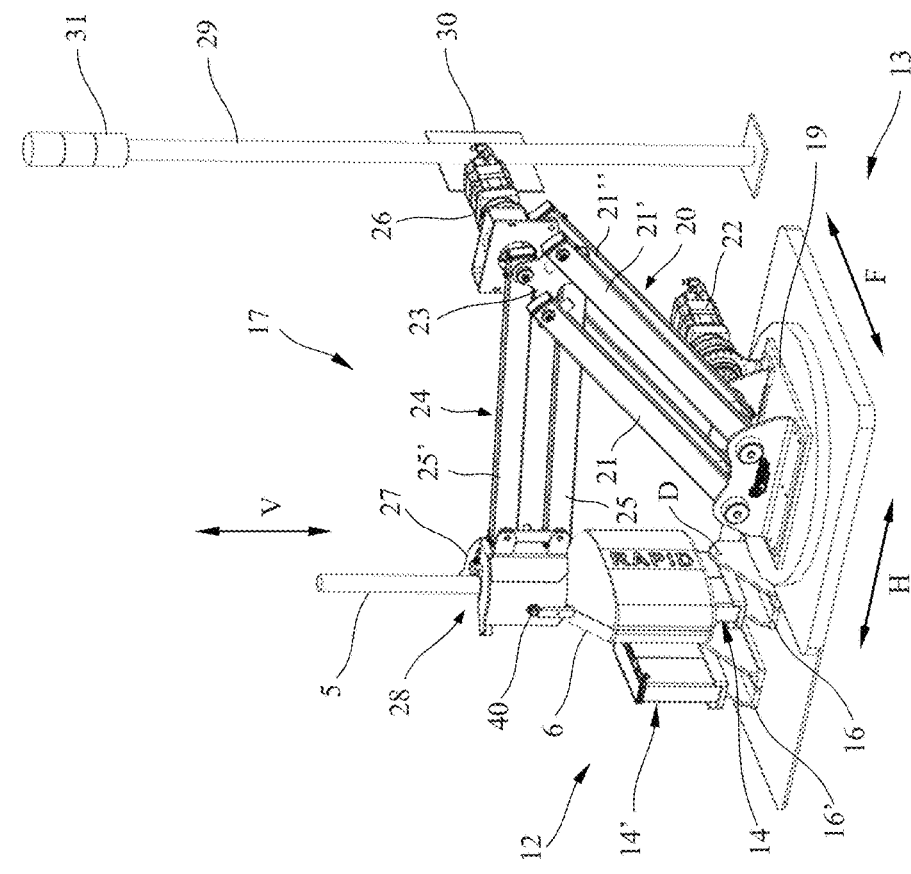
FIG. 4 the manipulator arm of FIG. 3 while connecting the connecting plug to a plug connector of a feed device.

Disposed at the upper front end of the upper manipulator arm 24 is a gripping device 27 for the connector plug 6, which allows the connecting plug 6 to be accurately positioned with respect to the plug connector 14 by means of the manipulator 18, which moves only in the horizontal feed direction H and the vertical feed direction V. The gripping device 27 has a funnel-shaped feed opening 28 to allow the connecting plug 6 to be securely gripped and moved as shown in FIG. 4. A more detailed description will be provided below.

To enable positioning of the connector plug 6 relative to the manipulator 18, which moves only in the horizontal feed direction H at right angles to the travel direction F of the crane 1, in such a manner that the gripping device 27 can securely grasp the connecting plug 6, a signal mast 29 is mounted next to the connecting device 13. Disposed on the signal mast 29 is a positioning element in the form of an identification plate 30. The sensor unit 11, which in FIG. 2 is disposed on the lower right end of the roller bend 8, detects whether the identification plate 30, relative to the sensor unit 11, is in a position in which the manipulator 18 is capable of grasping the connecting plug 6. If so, the gripping procedure is triggered by the manipulator 18, which to a certain extent can adjust different distances in the horizontal feed direction H.

For example, it is possible to check whether or not the identification plate 30 is located within the measuring range of the sensor unit 11. Thus, the identification plate 30 may have a large-surface QR Code and the sensor unit 11 may have a very narrow measuring range, within which the QR Code must fall. As an alternative or in addition thereto, the identification plate 30 may also have a reflector foil of known dimensions and position, in which case the distance thereto subsequently is preferably measured by means of the sensor unit 11. As soon as the beginning of the reflector foil is detected, the position of the crane 1 and the cable guiding device 7 with respect to the manipulator 18 can be determined based on the known dimensions. The distance measurement can also serve for the manipulator 18 to grasp the connecting plug 6 quickly and at the most accurate distance possible.

Because the feed opening 28 has the shape of a funnel, a certain offset of the connecting plug 6 in the travel direction F can be adjusted even if the crane 1 is not completely accurately positioned relative to the feed opening 28.

To signal the accurate positioning and optionally a securely established connection between the connecting plug 6 and the plug connector 14 to the driver or operating personnel of the crane 1, an easily visible signal light 31 having the conventional traffic light signal colors of Red, Yellow, and Green is mounted on the upper end of the signal mast 29. Red signals that no connection has yet been established, Yellow indicates that the connection is being established, and Green signals the established connection and the withdrawal of the manipulators 18, i.e., clearance for further movement. It is, however, also possible to use different colors of light signals, such as slow and rapid blinking or the like. As an alternative, the signal light 31 can also be used to inform the driver whether or not a plug connector 14, 14' on the feed device 12 is still open: Red would then indicate "none open" and Green "open plug connector," whereas Yellow would signal that a connection to the feed device is in the process of being established.

By way of an example, the procedure of griping and connecting the connecting plug 6 to the plug connector 14 will be described with reference to FIGS. 3 to 6.

Figure 3:
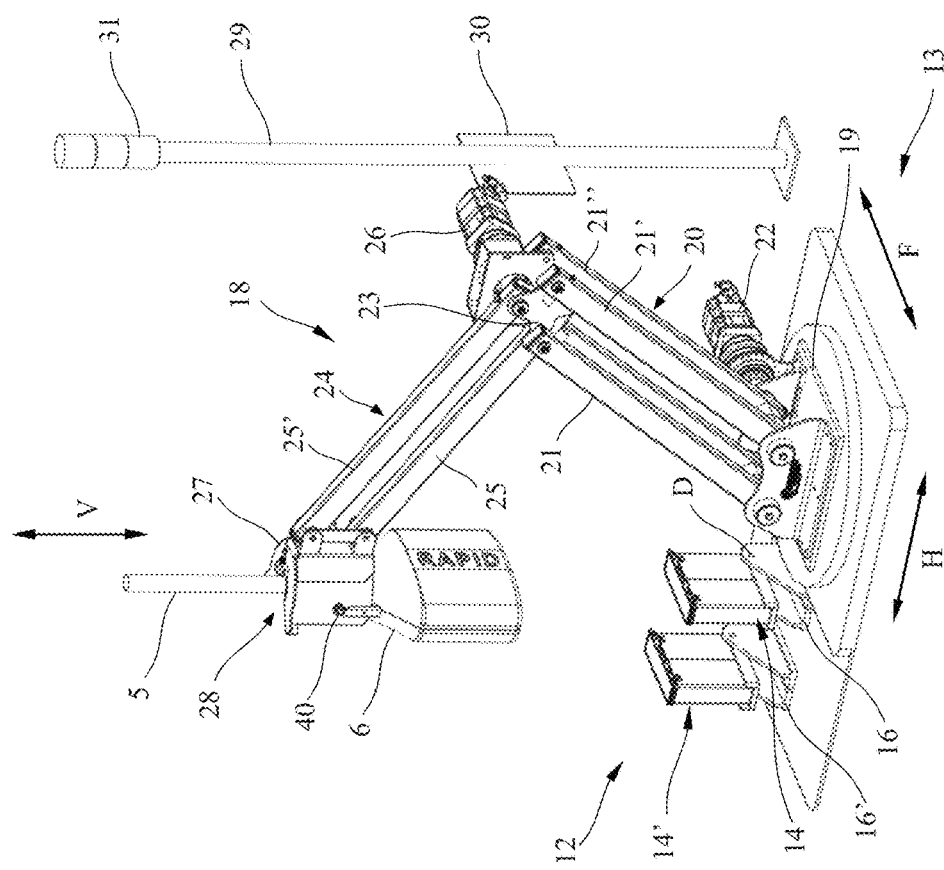
FIG. 3 a diagrammatic three-dimensional view of a manipulator arm of the connecting device of FIG. 2 while gripping a connecting plug.

In FIG. 3, the crane 1 has already been moved into a favorable position with respect to the connecting device 13, and the manipulator arm 18 has already gripped the connecting plug 6 by means of the gripping device 27. Prior thereto, the manipulator 18 travels with the gripping device 27 toward the line cable 5 above the connecting plug 6 and grips it. Subsequently the gripping device 27 travels from the top downwardly via an upper cylindrical gripping member 38 of the connecting plug 6 up to a stop (not shown) until a grip stop locks the connecting plug 6 to the gripping device 27.

The gripping member 38 comprises a centering funnel 39 (readily visible in FIG. 2) into which oppositely lying centering pins 40 disposed in the funnel-shaped feed opening 28 engage. In FIG. 2, the position of a centering pin 40 on the outside of the gripping device 27 can be seen. The advantage of this configuration is that the connecting plug 6 held by the gripping device 27 is oriented in such a manner that it can be accurately plugged into one of the plug connectors 14, 14'.

By rotating the upper manipulator arm drive mechanism 26 and optionally the lower manipulator arm drive mechanism 22, the manipulator 18 subsequently moves the connecting plug 6 over the plug connector 14, as shown in FIG. 3, so that a connecting plug opening 32 (only visible in FIG. 6) of the connecting plug 6 is aligned with the outside contour of the plug connector 14. As FIG. 4 indicates, the connecting plug 6 is subsequently pushed onto the plug connector 12 by means of the manipulator 18 and is detachably connected to a plug latching mechanism that is not shown in detail but will be described in detail below. At the same time, the plug connector 14 also establishes an electrical connection between an electrical power supply source of the container stacking area, which power supply source is connected to the plug connector 14, and the connecting plug 6 of the crane 1 and thus to the electrical supply network of said crane. Similarly, a data link, e.g., an electrical or optical data link can be established, e.g., by making available detachable plug connections.

The guide system of the manipulator 18 in the form of two parallelograms offers the advantage that it ensures that the gripping device 27 during its movement does not change its angle of inclination with respect to the plug connector 14. Thus, the connecting plug 6 moved by the gripping device 27 is not tilted out of the ideal position shown in the drawings, thereby ensuring that the line cable 5 is not excessively bent or even kinked off. To ensure this result, the design of the manipulator 18 can, however, differ from that used for the guide system in the form of a parallelogram, for example, by using a robot having at least one robot arm and a gripping device disposed thereon, or by using another method known to those skilled in the art. For example, it is also possible to use two linear telescopic arms or extensions, such as one horizontal and one vertical extension.

Figure 5:
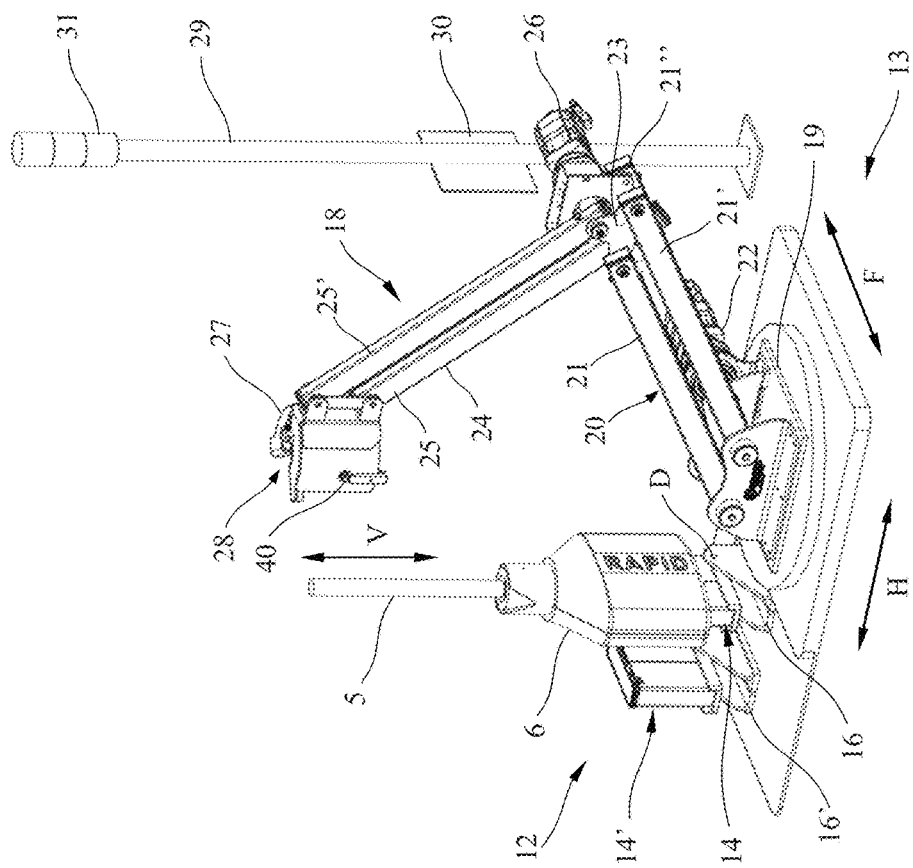
FIG. 5 the manipulator arm of FIG. 3 in a retracted position after releasing the connecting plug.

Subsequently, as shown in FIG. 5, the grip stop of the gripping device 27 is released and the manipulator 18 is moved by turning the manipulator arm drive mechanisms 22, 26 away from the line cable 5 and the connecting plug 6 to the right side of the crane 1 as seen in FIG. 5. Subsequently, the signal lamp 31 signals to the operating personnel of the crane 1 that the connection between the connecting plug 6 and the plug connector 14 has been established and the manipulator 18 has been released, i.e., the crane 1 can move away from the connecting device 13 to resume its normal operation. In the current practical example, the connecting device 13 is disposed at the entrance to a traveling path for the crane 1 so that the movement along the container stacking areas in FIGS. 2 to 6 is oriented diagonally upwardly to the right. The connecting device 13 can, however, also be disposed at a different spot.

As known from the prior art, to ensure the longest possible life of the line cable 5, it is important that it is seldom, if ever, bent beyond the admissible minimum bending radius or kinked off.

Thus, one aspect of the present invention relates to making available an improved guide system for the line cable 5 that is connected to a feed device and, more specifically, to reduce the risk of the line cable 5 kinking off or being excessively bent while moving the electrical load, in particular the crane 1.

Figure 6:
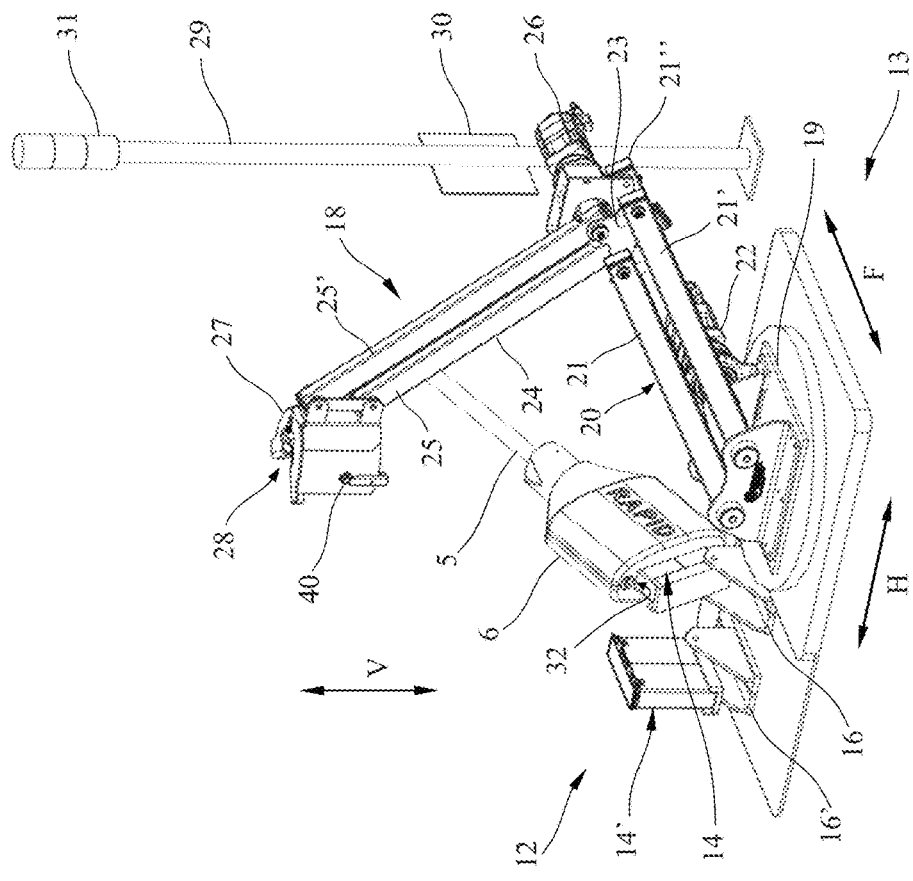
FIG. 6 same view as FIG. 5 with the plug connector swiveled out of the resting position by the movement of the crane.
Figure 7:
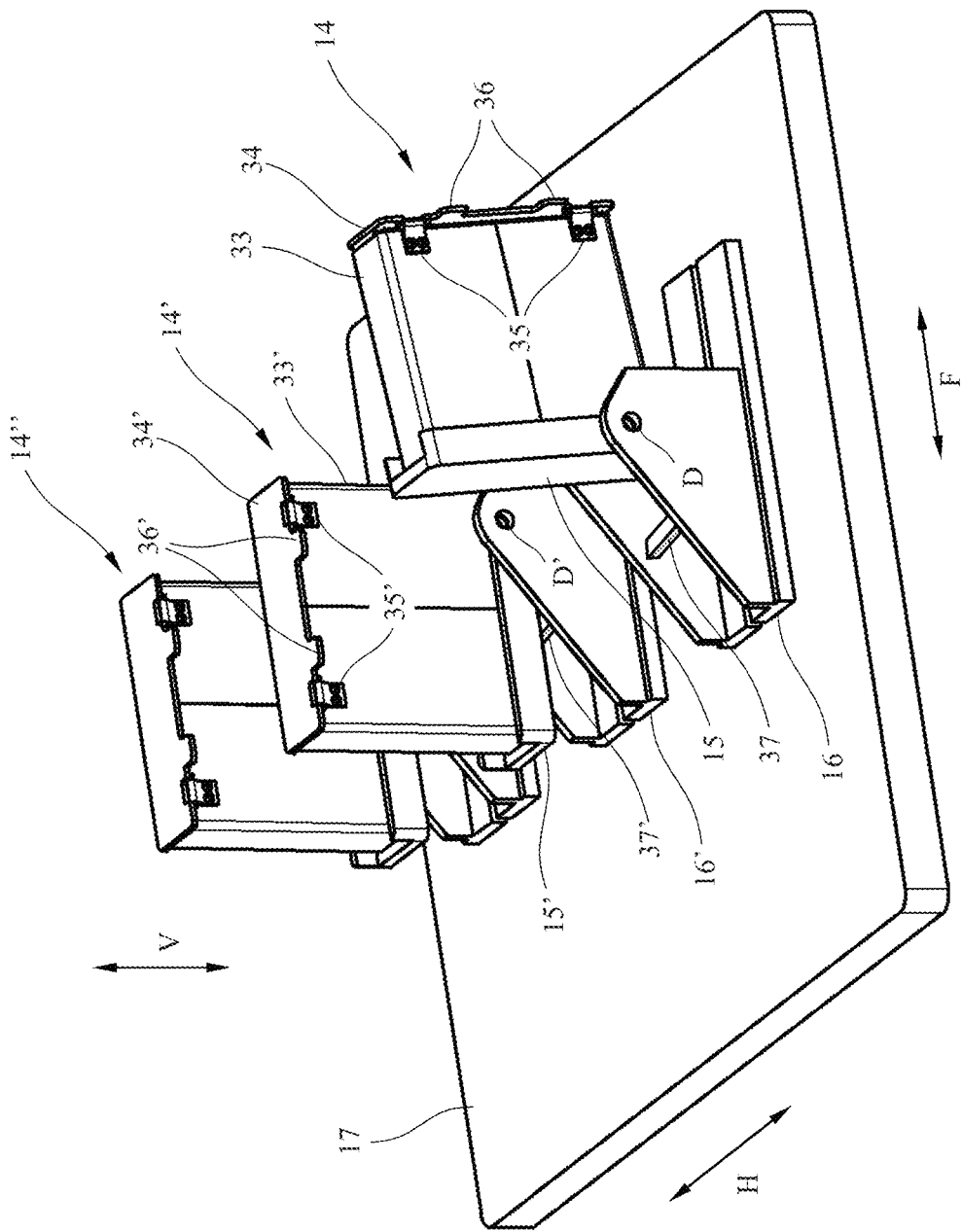
FIG. 7 a detail view of a portion of the feed device of FIGS. 2 to 6.

To this end, the invention proposes that the plug connectors 14, 14' be pivotably disposed about an axis of rotation D and D' extending at right angles relative to the travel direction F and preferably parallel to the ground, as indicated especially clearly in FIGS. 6 and 7. When the crane 1 with the line cable 5 subsequently moves out of the connected position shown in FIG. 2 in the travel direction F toward the right, as indicated in FIG. 6, the line cable 5, because of the plug connector 14 that swivels in the travel direction F, will not be bent or will hardly be bent or kinked off, but instead runs from the plug connector 14 predominantly straight and in the direction of pull of the line cable 5 to the cable guiding device 7. As the crane 1 subsequently moves farther away from the feed device 12 and the connecting device 13, the line cable 5 is laid down, section by section, as known in the art, next to the traveling path of the crane 1. In contrast to the prior art, however, in the current embodiment, the plug connector 14 is tilted just enough so that the connecting plug 6 slants slightly downwardly and the line cable 5, coming from the connecting plug 6 in a hardly bent or only slightly bent condition, is laid down on the ground.

Thus, throughout the entire laydown process, the line cable 5 undergoes only slight bending, which ensures protected line guidance, prolongs the life of the line cable 5, and thus increases the reliability of the facility.

The use of the rotary function of the plug connector 14 illustrated in the drawings and described above is also possible in facilities in which the line cable 5 is permanently connected to the feed device 12, thereby leading to the advantages of improved line cable guidance in these situations as well.

The detail view of the connecting device 13 in FIG. 7 shows an additional plug connector 14" that, however, has the same function as the plug connectors 14, 14'. Because these have the same design, the invention will hereinafter preferably be explained with reference to this specific plug connector 14. The other two plug connectors 14', 14" and their parts will be identified using reference characters identical to those used for the plug connector 14, with the addition of one or two apostrophes if required.

The plug connector 14 comprises a plug connector housing 33 in which the electrical connector elements for an electrical power connection and/or a data link connection (not shown) are disposed.

To prevent moisture, dust, water, rain, etc. from penetrating the electrical connector elements from above, the upper end of the plug connector housing 33, which in FIG. 2 is shown in its resting position, has a cover 34 that is pivotably hinged to the plug connector housing 33 by means of two hinges 35. The cover 34 is held, as known in the art, by the action of a spring in the closed position and moved from an open position back into the closed position.

In order to enable automatic opening of the cover 34 while the connecting plug 6 is being placed on or plugged in, opening tabs 36 interactively connected to the cover 34 are disposed on the surface of the hinges 35, which opening lugs project outwardly beyond the plug connector housing 33. A mating stop in the connecting plug 6, specifically the mating edge of the connecting plug opening 32, pushes the opening tabs 36 downwardly while the connecting plug 6 is being placed or pushed over the plug connector housing 33, which causes the cover 34 to move upwardly. This uncovers the electrical connector elements of the plug connector 14. Subsequently, the connecting plug 6 is moved further downwardly and the electrical and/or data connector elements, in this case male, located in the connecting plug 6 can be connected to the mating connector elements, in this case female, in the plug connector housing 33 and be protected against outside influences, such as wind, water, rain, etc. The cover 34 also prevents operating personnel or unauthorized persons from accessing the connector elements, specifically the electrical connector elements, directly and without protection.

To retain the swivel plate 15 and thus the plug connector 14 in the resting position shown in FIGS. 2 to 5, a stop 37 shown in FIG. 7 can be disposed on the bearing 16 for the swivel plate 15. In the embodiment shown, the plug connector 14 subsequently remains in the resting position as a function of the weight. According to a useful embodiment (not shown), it is also possible to have an elastic force act upon the swivel plate 15 in order to return the plug connector 14 to its resting position when it is not connected to the connecting plug 6.

According to an alternative design of the connecting device 13 that can preferably also be disposed along a traveling path of the crane 1, the plug connectors 14, 14' are preferably designed to be capable of pivoting about an axis of rotation D, preferably disposed in the center, in both directions of the travel direction F, i.e., the line cable 5 can be laid down on both sides of the plug connectors 14, 14'. Again, it is useful to provide a holding device that ensures the unconnected plug connector is in a position suitable for connecting the connecting plug 6 and preferably pointing upwardly. The plug connector 14 can then be locked to the ground plate 17 until the connecting plug 6 is securely connected to the plug connector 14. This type of embodiment will be described later and can be independently implemented by those skilled in the art.

FIGS. 8 to 28 show alternative embodiments of parts of the power transmission system, the principle of which is shown in FIG. 1, specifically with a modified feed device 112, connecting device 113, and cable guiding device 107. Because these have a largely identical or similar function as those shown in FIGS. 2 to 7, these components are identified by identical reference characters, each with the addition of "100." Any differences will be specifically pointed out so that, unless otherwise specified, explanations relating to specific components in the first embodiment according to FIGS. 2 to 7 equally apply to the alternative embodiments of FIGS. 8 to 28 and vice versa.

Figure 8:
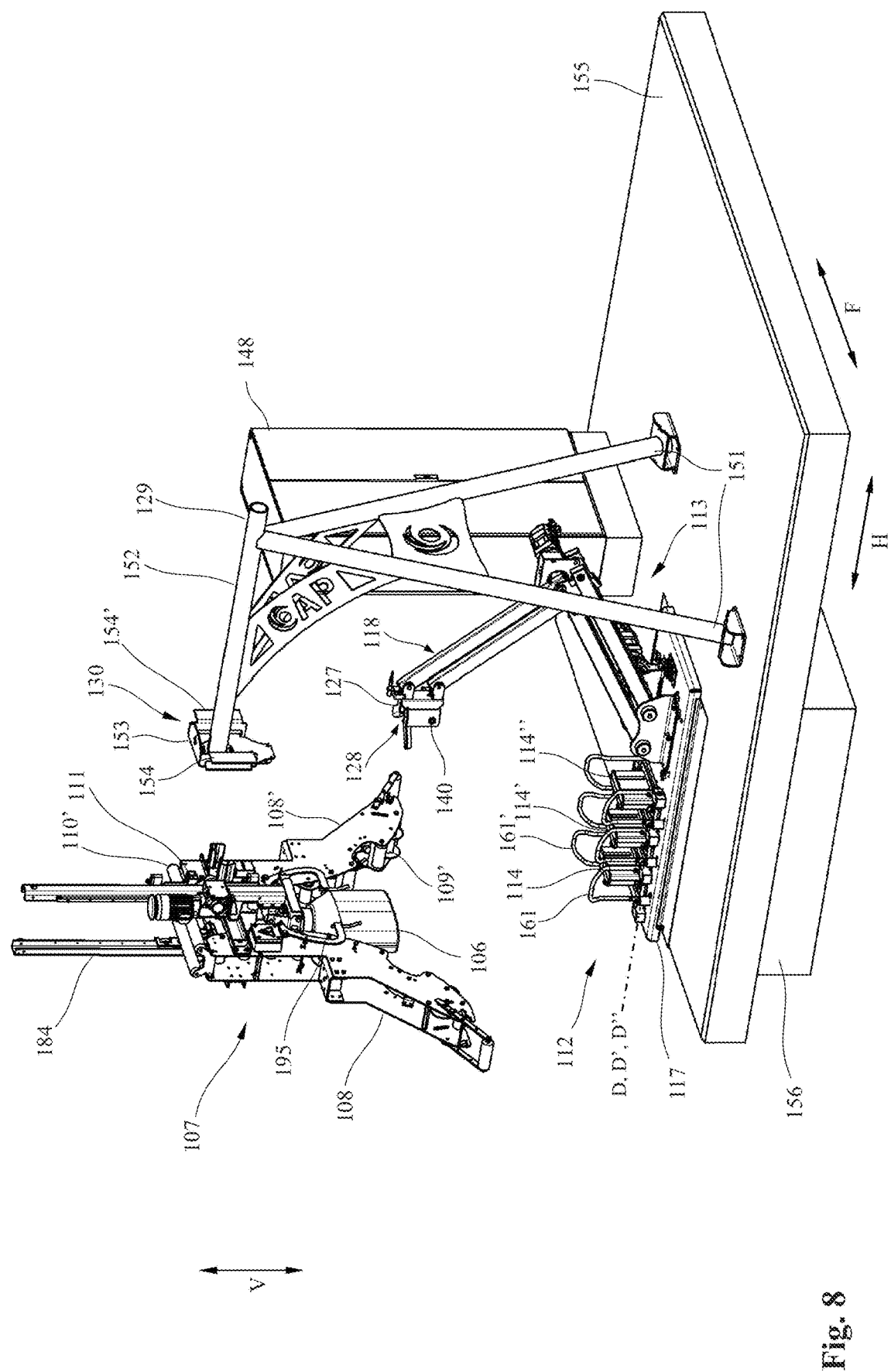
FIG. 8 a diagrammatic three-dimensional view of a section of FIG. 1 showing a second connecting device in an alternative design prior to gripping a connecting plug.
Figure 16:
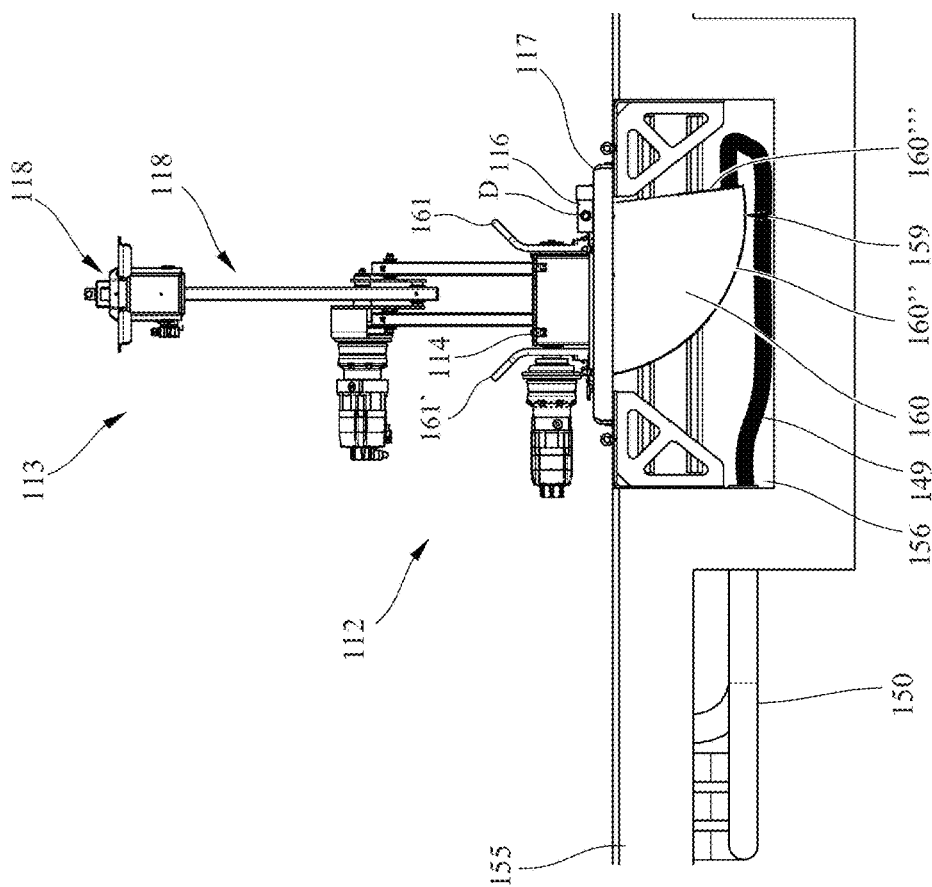
FIG. 16 a lateral view of a partially sectioned diagram of the feed device and connecting device of FIG. 14 as seen from top left in FIG. 14.

The feed device 112 shown in FIG. 8 includes a control cabinet 148 in which the electrical voltage supply unit is located and to which supply and data cables 149 as indicated in FIG. 16 lead, which cables run through cable ducts 150, 150', 150" (see FIGS. 16 to 18) into the control cabinet 148.

The working principle of the power transmission system in FIGS. 8 to 13 is basically the same as that shown in FIGS. 2 to 7. Thus, in FIG. 8, the line cable 5 having a connecting plug 106 is again positioned relative to the manipulator 118 in such a manner that a gripping device 127 can grasp the connecting plug 106 during movement in the horizontal feed direction H. Subsequently, the connecting plug 106 is slightly released so that the manipulator 118 can grasp it with the gripping device 127 as described above and move it into the position required to place it onto the plug connector 114. The plug connector 114 has the same design as the plug connector 14 and comprises specifically a plug connector housing having a movable cover.

Figure 9:
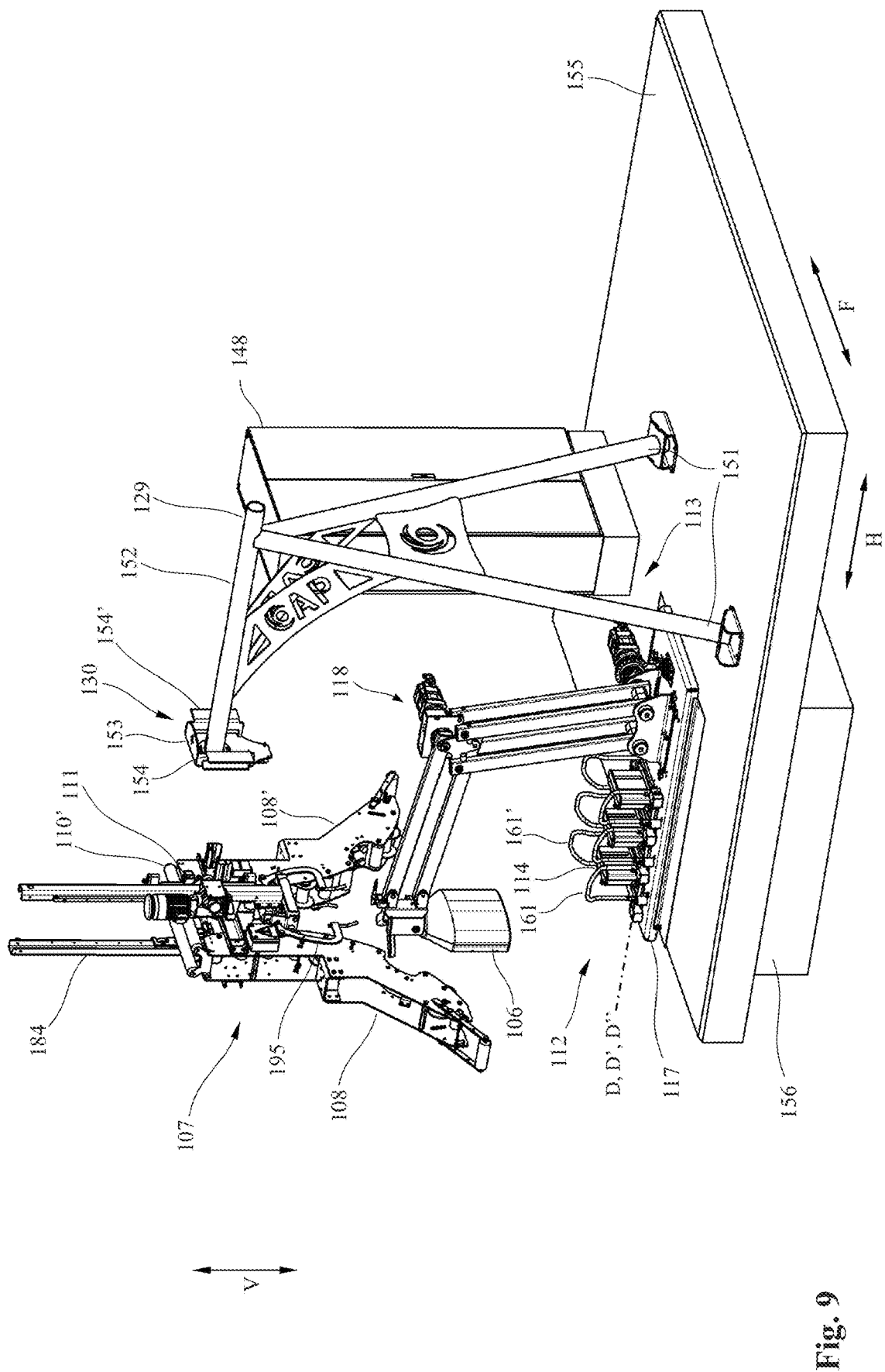
FIG. 9 a diagrammatic three-dimensional view of a manipulator arm of the connecting device of FIG. 8 while gripping the connecting plug.
Figure 10:
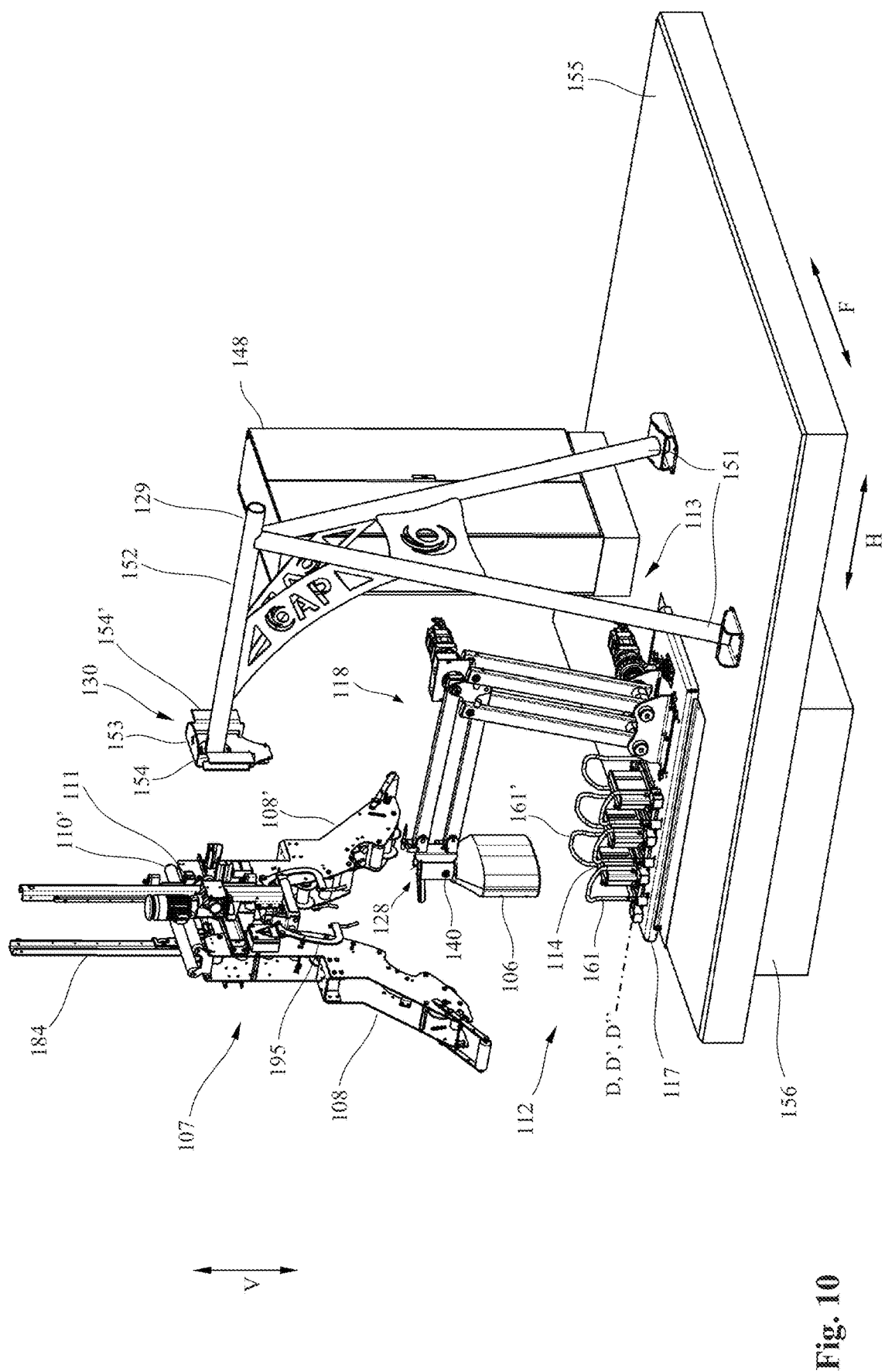
FIG. 10 same view as FIG. 9 showing the manipulator arm of FIG. 9 while guiding the connecting plug to a plug connector of the feed device.
Figure 11:
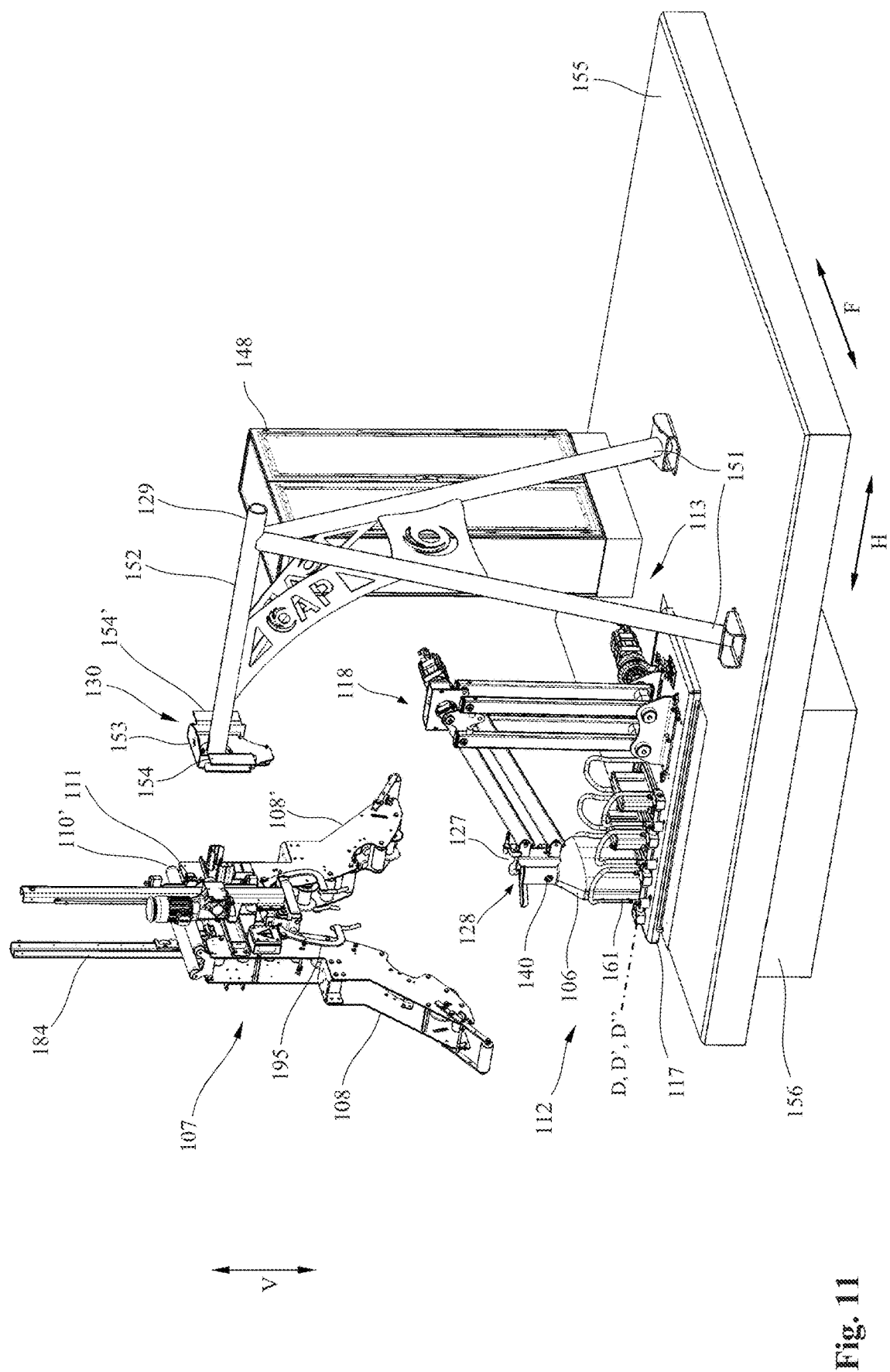
FIG. 11 same view as FIG. 9 showing the manipulator arm of FIG. 9 while connecting the connecting plug to the plug connector.

Subsequently, the connecting plug 106 is again moved from the position in FIG. 9 to a plug connector 114 on which it is placed as described above and as illustrated in FIGS. 10 to 11. The connecting plug 106 is again locked to the feed device 112, which will subsequently be explained in greater detail below with reference to FIGS. 19 and 20. Subsequently, as shown in FIG. 12, the manipulator 118 can be disengaged from the connecting plug 106 and moved into its resting position.

Figure 12:
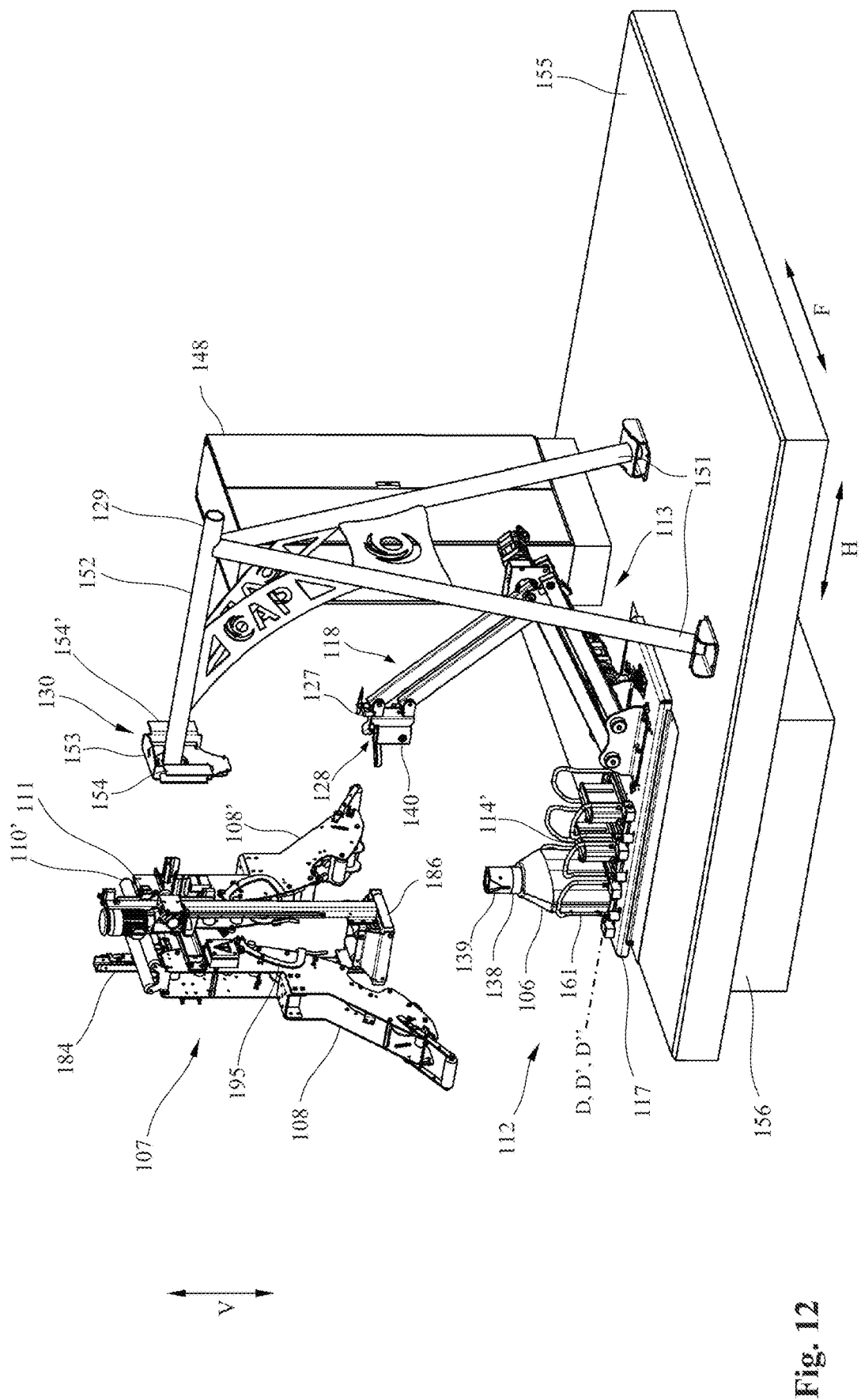
FIG. 12 same view as FIG. 9 showing the manipulator arm of FIG. 9 in a retracted position after releasing the connecting plug.
Figure 13:
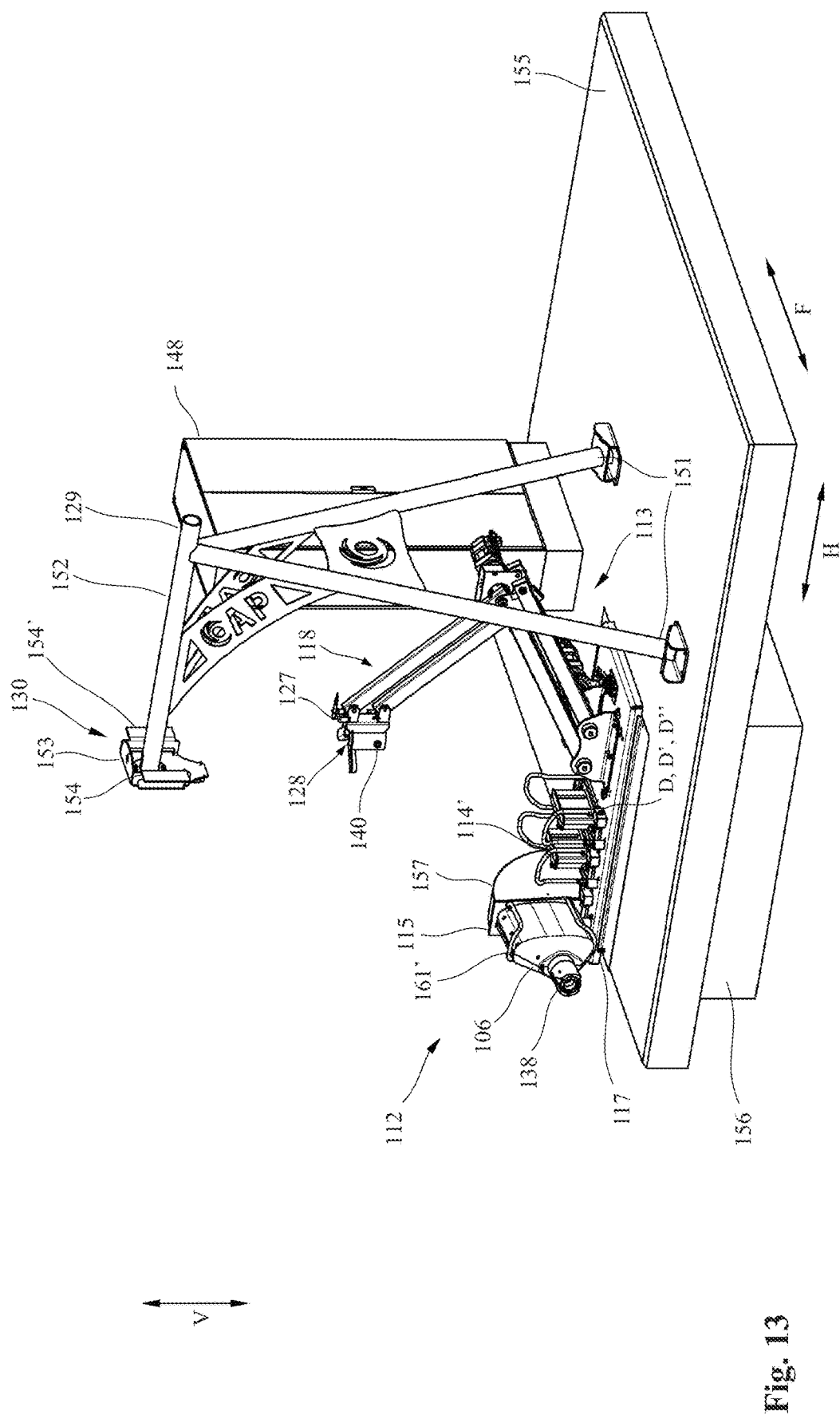
FIG. 13 same view as FIG. 12 showing the plug connector swiveled out of the resting position.

FIG. 13 shows that by moving the crane 1 (not shown), the connecting plug 106 having the plug connector 114 is again swiveled about the axis of rotation D from the resting position shown in FIG. 12.

The alternative signal mast 129 shown in FIGS. 8 to 13 comprises two slanted legs 151 supporting a boom 152, on the free front end of which an alternative identification plate 130 is mounted. In keeping with this, an alternative sensor 111 is disposed on the cable guiding device 107, which sensor is used to detect the identification plate 130. In this context, it is useful to use a distance sensor 111 having a narrow measuring range. The identification plate 130 preferably has a central front section 153 relative to the horizontal feed direction H, and on both sides, in the travel direction F, adjoining bracket-like sections 154, 154' that, relative to the central section 153 in the horizontal feed direction H, are offset toward the rear, i.e., away from the crane 1. The identification plate 130 preferably comprises a reflector, e.g., a reflector foil, in order to reflect the signal emitted by the distance sensor 111 as effectively as possible. Optionally, however, the identification plate 31 of the practical example described earlier can be used as well.

To position the connecting plug 106 so as to be centered relative to the central section 153, the distance sensor 111, at the beginning of movement in the travel direction F from right or left as seen in FIG. 8, first detects the distance relative to one of the two rear bracket-like sections 154, 154'. As it subsequently travels in the travel direction F further to the central section 153, it detects, while spatially capturing the central section 153, a sudden decrease in distance and thus the beginning of the central front section 153. Based on the known geometric dimensions, in particular the extent of the central section 153 in the travel direction F, the travel length still required in the travel direction F can be determined in order to position the connecting plug 106 as accurately as possible on the gripping device 127.

Using this approach simplifies positioning of the connecting plug 106 with respect to the manipulator 118 in that an active sensor 111 can be disposed only on the cable guiding device 107 whereas the identification plate 130 can be a passive element. The configuration of the identification plate 130 can be different as long as it is possible for the sensor 111 to detect a clearly defined change in distance, e.g., the central section can be offset toward the rear, and the bracket-like section can be closer to the crane 1. More particularly, in the simplified version, the bracket-like sections 154, 154' can be omitted so that only the transition from completely nonreflecting or unsatisfactorily reflecting surroundings to the highly reflective area of the identification plate needs to be determined. Furthermore, optionally the central section 153 and the adjoining bracket-like sections 154, 154', regardless of whether or not they are offset with respect to each other in the horizontal feed direction H, can reflective properties of varying quality so that a differentiation is possible based on the level of the reflected signal strength.

In addition, the embodiment according to FIGS. 8 to 28 differs from the version shown in FIGS. 2 to 7 with respect to the swivelable plug connectors 114. Therefore, the following discussion will again focus mainly on the differences whereas the explanations provided in the context of the discussion of FIG. 1 continue to apply to identical or similar components. Thus, unless otherwise specified, because of the identical design of the plug connectors 114, 114', 114", the invention will again be described with reference to the plug connector 114. Accordingly, these explanations also apply to the other plug connectors 114', 114".

Figure 17:
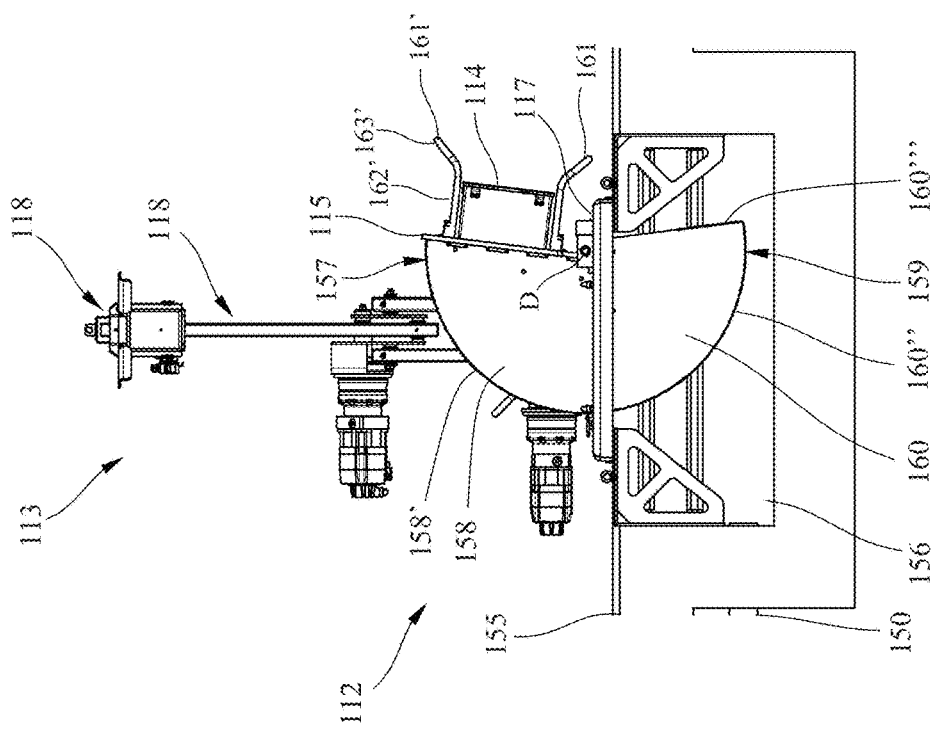
FIG. 17 a lateral view of FIG. 16 with the plug connector swiveled out of the resting position according to FIG. 15.
Figure 20:
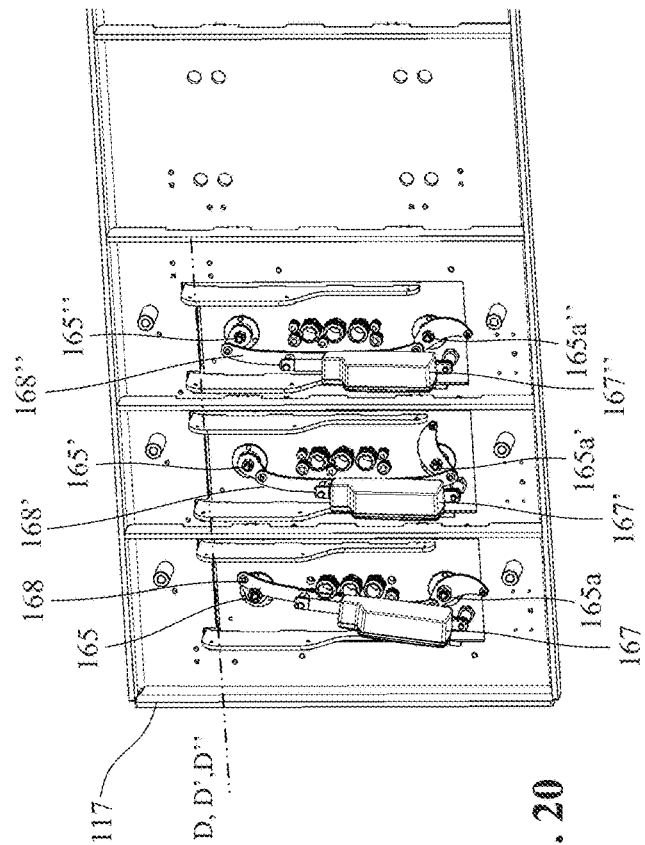
FIG. 20 a diagrammatic detail view of the plug latching mechanism of FIGS. 18 and 19 from below.
Figure 18:
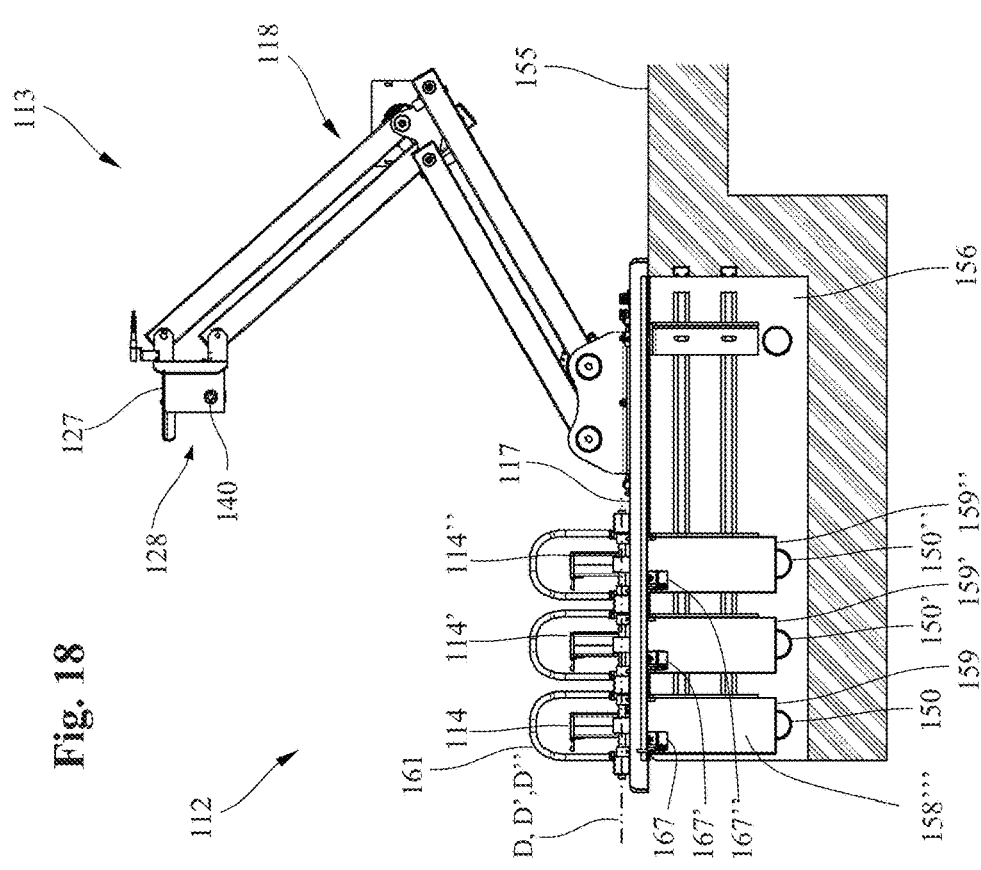
FIG. 18 a lateral view of a partially sectioned diagram of the feed device and connecting device of FIG. 14 as seen from bottom left in FIG. 14.

As FIGS. 16 to 18 indicate, the plug connector 114 is mounted by means of a swivel plate 115 on a bearing 116 on a mounting plate 117 so as to pivot about an axis of rotation D. However, the plug connector 114 could also be pivotably disposed directly on the mounting plate 117. The axis of rotation D extends substantially horizontally and in the direction of the horizontal feed direction H of the manipulators 118. The mounting plate 117 is disposed above a pit 156 located in the foundation 155. As indicated in FIGS. 16 and 18, the cable ducts 150 coming from the control cabinet 148, in which cable ducts run the energy supply and data cables 149 shown in FIG. 16, open out in the pit 156. These cables 149 are each routed through a connecting opening disposed in the ground plate 117 under the plug connector 114 to the bottom side of the plug connector 114, where they are electrically connected to the female connector elements of the plug connector 114, as indicated in FIG. 20.

Figure 15:
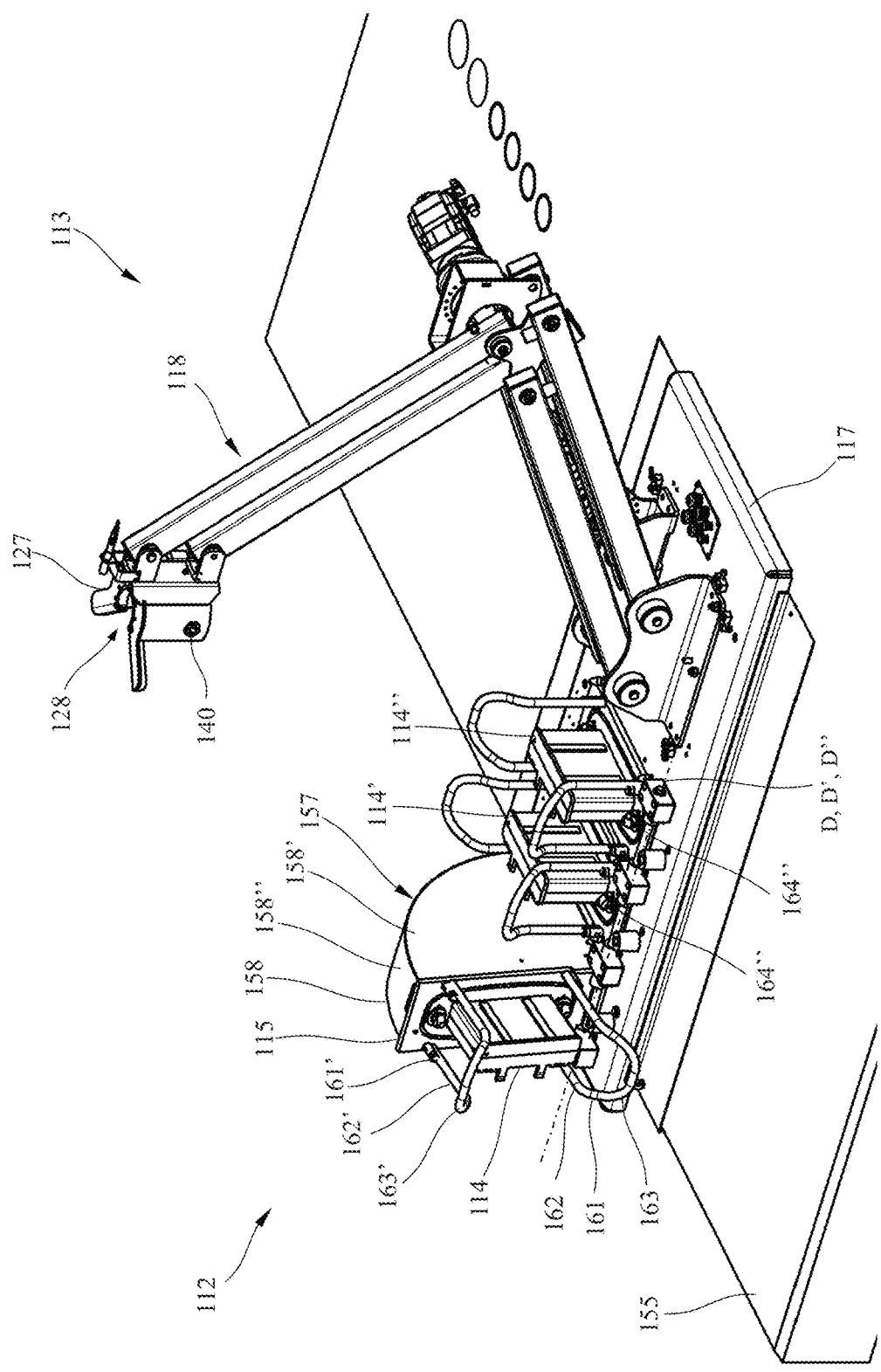
FIG. 15 a detail view of FIG. 14 with the plug connector swiveled out of the resting position according to FIG. 13.

To be able, while swiveling the plug connector 114, to accurately guide the cables 149 and to encapsulate them against the surroundings—inter alia, for reasons of electric shock protection—said cables being disposed on the bottom side of the plug connector 114, a first protective enclosure 157, which pivots with the swivel plate 115 about the axis of rotation D, is disposed on the bottom side of the plug connector 114, more particularly on the bottom side of the swivel plate 115. Adjoining the bottom side of the swivel plate 115 are identically configured, circular-arc-shaped side walls 158, 158' measuring approximately 100° as well as a front wall 158" of the first protective enclosure 157, which front wall connects the circular arc surfaces of the side walls 158, 158', as illustrated in FIGS. 15 and 17. A second front face between the side walls 158, 158', the front wall 158", and the swivel plate 115 remains unconnected and forms an opening 158''' visible from the front in FIG. 18 for the cables 149 coming from the cable duct 150.

Figure 14:
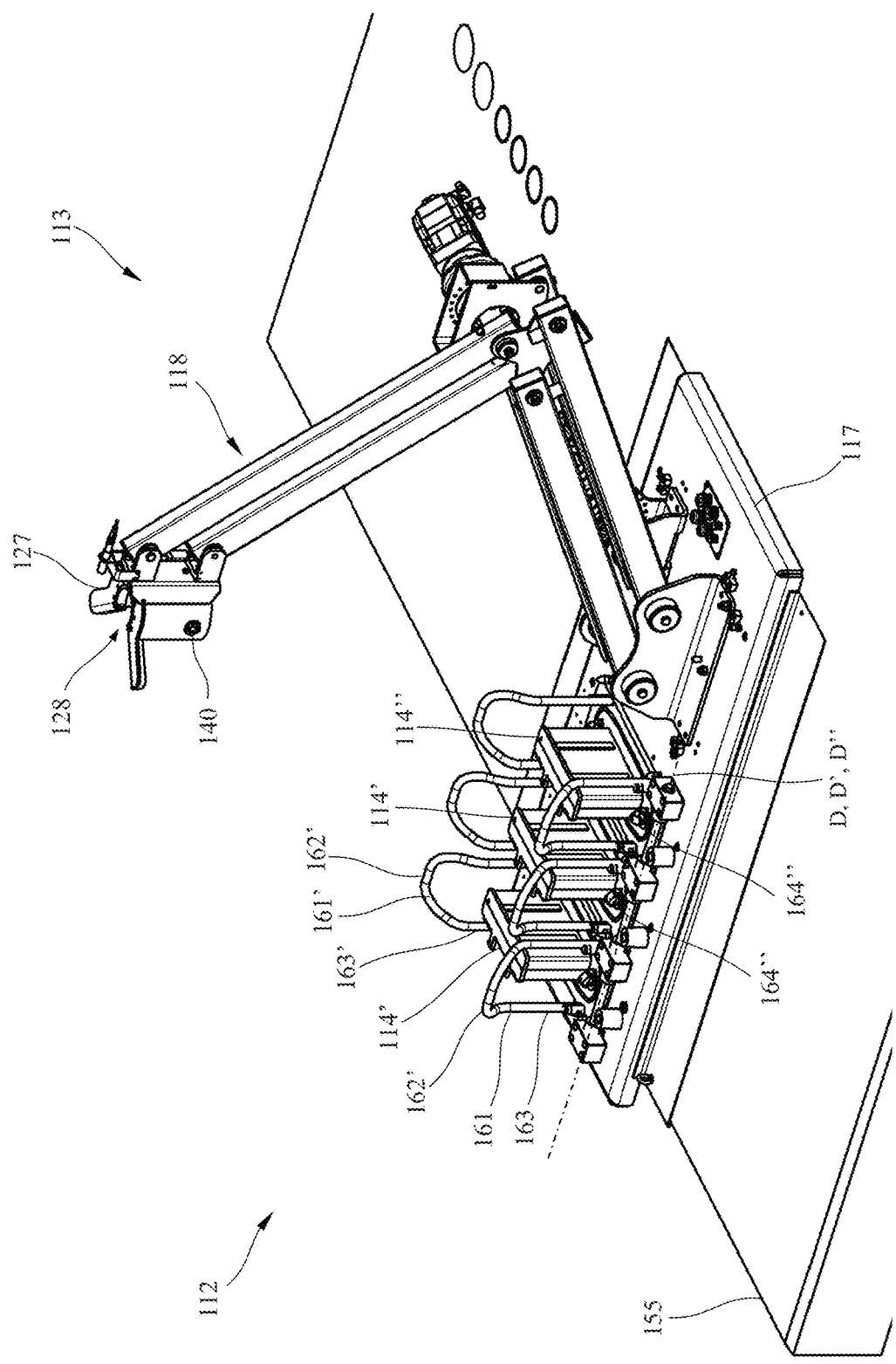
FIG. 14 an enlarged detail view of the feed device and connecting device of FIG. 9 with the plug connector in the resting position.

The protective enclosure 157 is enclosed in a second protective enclosure 159 having circular-arc-shaped side walls 160, 160', a front wall 160" connecting these side walls, and an opening 160''' on the front for the cables 149 coming from the cable duct 150, which second protective enclosure has the same shape, but is slightly larger and rigidly attached to the lower surface of the ground plate 117. Alternatively, the second protective enclosure 159 can be omitted because the first protective enclosure 157 also offers protection for the cables 149 when the swivel plate 115 is lowered as indicated in FIGS. 14 and 16.

The length of the cables 149 is dimensioned in such a way that it is possible for the plug connector 114 to assume a completely swiveled-out position as shown in FIGS. 15 and 17. In the completely swiveled-in position of the plug connector 114 shown in FIGS. 14 and 16, the excess length of the cable 149 preferably folds inside the protective enclosures 157, 159. Because the cables 149 in the area of the protective enclosures 157, 159 are completely surrounded by said enclosures, the cables 149 are reliably guided while the plug connector 114 is swiveled so that both the risk of damage to the cable 149 and the risk of hindering the movement of the plug connector 114 are eliminated. To guide the cables 149, a cable carrier (not shown) is preferably used, which cable carrier extends along the bottom of the pit 156 and subsequently follows an S-shaped course in the upward direction as shown in FIG. 17.

To enable adjustment of slightly inaccurate positioning of the connecting plug 106 with respect to the plug connector 114, a centering bracket 161, 161' is disposed each on the narrow front faces of the swivel plate 115. These centering brackets comprise a lower vertical guide section 162, 162' that is adjoined by an upper slanted feed-in section 163, 163' that faces away from the plug connector 114. When the plug connector 114 is plugged in, as shown, for example, in FIG. 13, the vertical guide sections 162, 162' enfold the connecting plug 106, which improves positioning and, more specifically, pre-centering of the connecting plug 106, on the plug connector 114.

Figure 19:
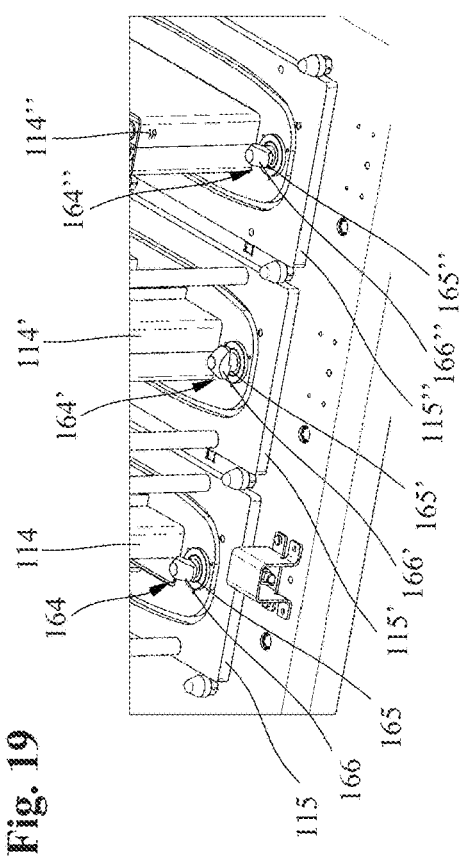
FIG. 19 a diagrammatic detail view of a plug latching mechanism of the connecting device of FIG. 18 as seen diagonally from above.

To prevent accidental detachment of the connecting plug 106 from the plug connector 114, which is undesirable, especially when power is being transmitted, plug latching mechanisms 164, 164', 164" are disposed on the swivel plates 115, 115', 115" on the front faces of the plug connectors 114, 114', 114" plug latching mechanisms 164, 164', 164", which plug latching mechanisms can be especially clearly seen in FIGS. 19 and 20. Because of the identical design of the plug latching mechanism 164, 164', 164", unless otherwise specified, again only the plug latching mechanism 164 will be described.

The plug latching mechanism 164 comprises a latching bolt 165 that, in the region of the connecting plug 106, passes through the swivel plate 115 and projects upwardly beyond the swivel plate 115 and that comprises an oblong latching head 166. On the opposite front face of the plug connector 114, preferably an identically shaped latching bolt 165a is disposed, as indicated in FIG. 20.

Figure 24:
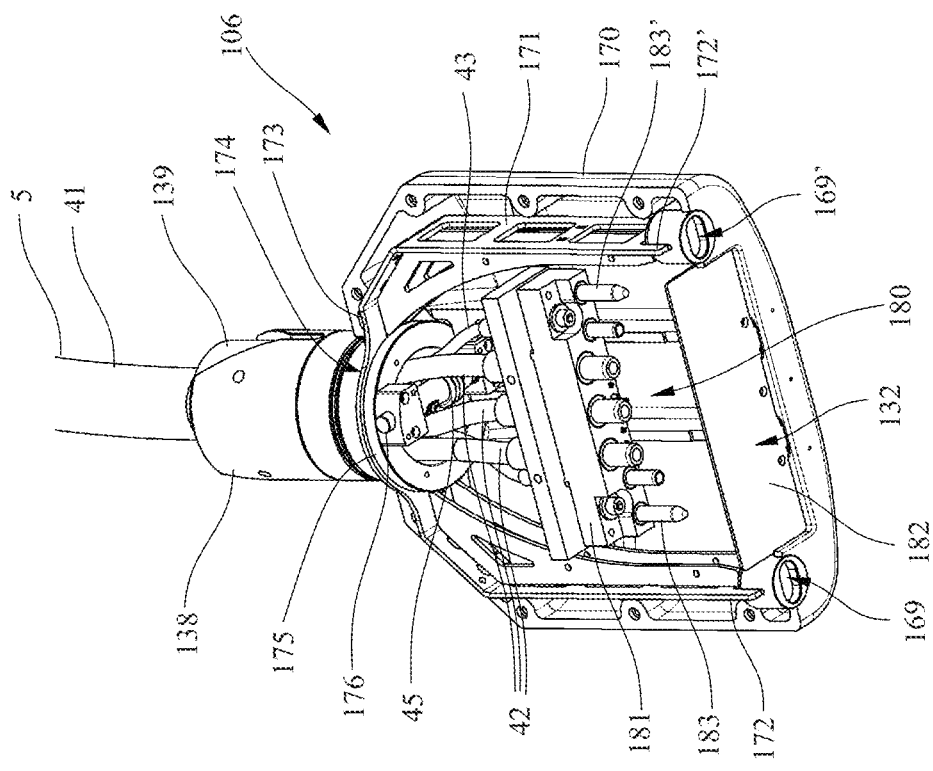
FIG. 24 a diagrammatic three-dimensional view of the connecting plug of FIG. 22 from a third perspective as seen diagonally from below.

In the open position, the latching head 166 is oriented in such a way that it can pass through a mating latch opening 169 on the connecting plug 106, which can be especially clearly seen in FIG. 24.

When the connecting plug 106 is fully placed on the plug connector 114, the latching head 166 and the latching head (not shown) of the latching bolt 165a can be simultaneously moved by means of the latching drive mechanism 167 shown in FIG. 20 via a lever assembly 168 from an open position, as indicated in FIGS. 19 and 20 using two outer plug connectors 114, 114", into a closed position advantageously rotated by 90°, as indicated in FIGS. 19 and 20 using the plug connector 114' in the middle. Optionally, however, a greater of smaller rotation can be used to ensure a secure lock. Preferably, the latching drive mechanism 167 simultaneously drives the latching bolt 165 and the oppositely lying latching bolt 165a via a lever assembly 168.

Instead of a lever assembly 168, a separate latching drive mechanism can be provided for each latching bolt 165, 165', 165" and 165a, 165a', 165a", respectively. In principle, each plug connector 114, 114', 114" can have only one plug latching mechanism.

The plug latching mechanism 164 according to the invention also serves to secure the swivel plate 115 to the ground plate 117 when no connecting plug 114 is connected. To this end, in the secured position shown in FIGS. 19 and 20, the lower lever arm, as shown in FIG. 20, that drives the lower rearward latching bolt 165a, as shown in FIG. 19, engages the ground plate 117 from below so that the swivel plate 115 cannot be swiveled about the axis of rotation D, which extends above the ground plate 117, and away from the ground plate 117. In contrast thereto, the middle swivel plate 115' is open, thereby allowing it to be tipped. As an alternative or in addition thereto, a retaining mechanism independent of the plug latching mechanism 164, more specifically a plug connector latching mechanism for the detachable attachment of the plug connector 114 in the resting position, can be disposed on the ground plate 117 until the connecting plug 114 and the plug connector 114 are securely connected to each other.

Another aspect of the invention provides that, for the purpose of improving the automatic connecting procedure, the line cable 5 can be specially configured. In addition, the connecting plug 6, 106 can also be specially configured in order to improve grasping of the manipulator 18, 118 and specifically the gripping device 27, 127, and this applies to both practical examples described above.

This will subsequently be described in detail with reference to FIGS. 21 to 24.

Figure 21:
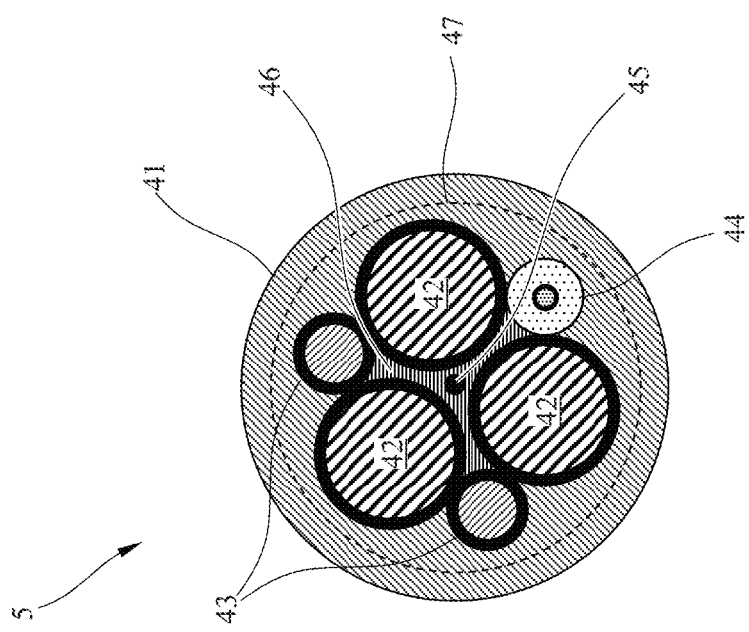
FIG. 21 a cross-sectional view through a line cable.

FIG. 21 shows a cross-section through a line cable 5, for example, slightly above the connecting plug 106. The line cable 5 comprises an outer casing 41 made of a flexible material, for example, rubber, PVC, or another elastic plastic. The outer casing 41 comprises three symmetrically disposed phase conductors 42 for the transmission of electrical power, a protective conductor comprising two separate conductors 43, and a data transmission conductor 44, specifically an optical data transmission conductor cable. Also disposed in the core of the line cable 5 is a flexible but robust supporting element 45, for example, an aramid rope or a wire rope. The supporting element 45 is surrounded by a filling material and/or molded parts 46, which serve as supports and retainers for the other conductors 42 to 44 of the line cable 5.

This relieves the tension acting on the sensitive conductors 42 to 44 that are disposed in the line cable 5, whereas the supporting element 45 serves primarily to absorb longitudinal forces during the winding and unwinding of the line cable 5. Furthermore, an additional tension relief mechanism 46 can be disposed in the outer casing 41, for example, a braided or woven fabric that is embedded in the outer casing 41.

Figure 22:
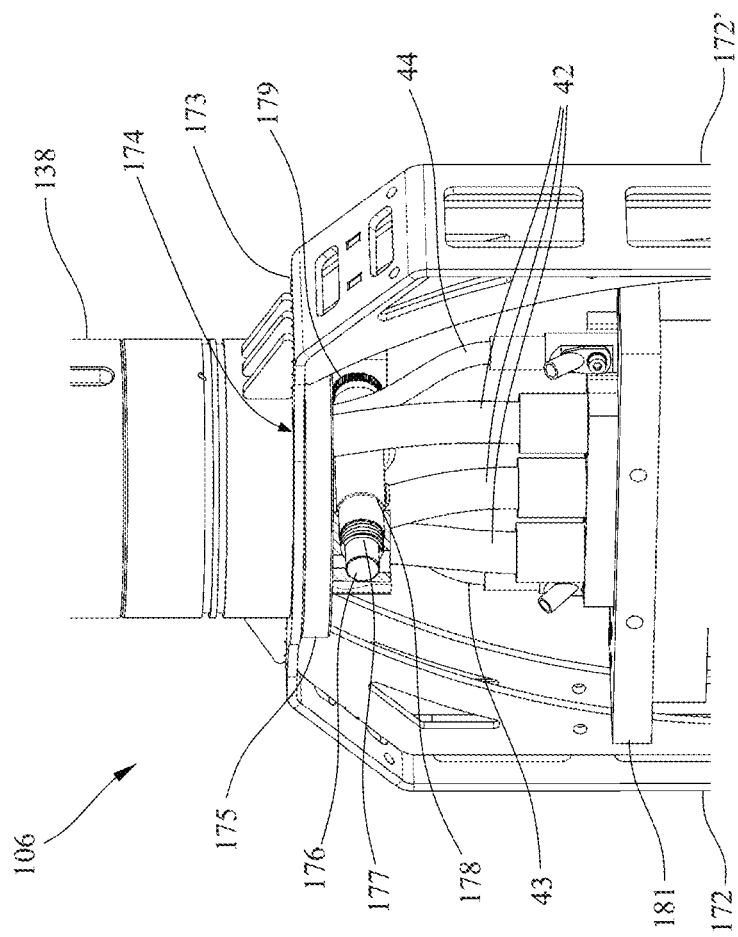
FIG. 22 an enlarged diagrammatic detail view of an opened connecting plug from a first diagonal side perspective.
Figure 23:
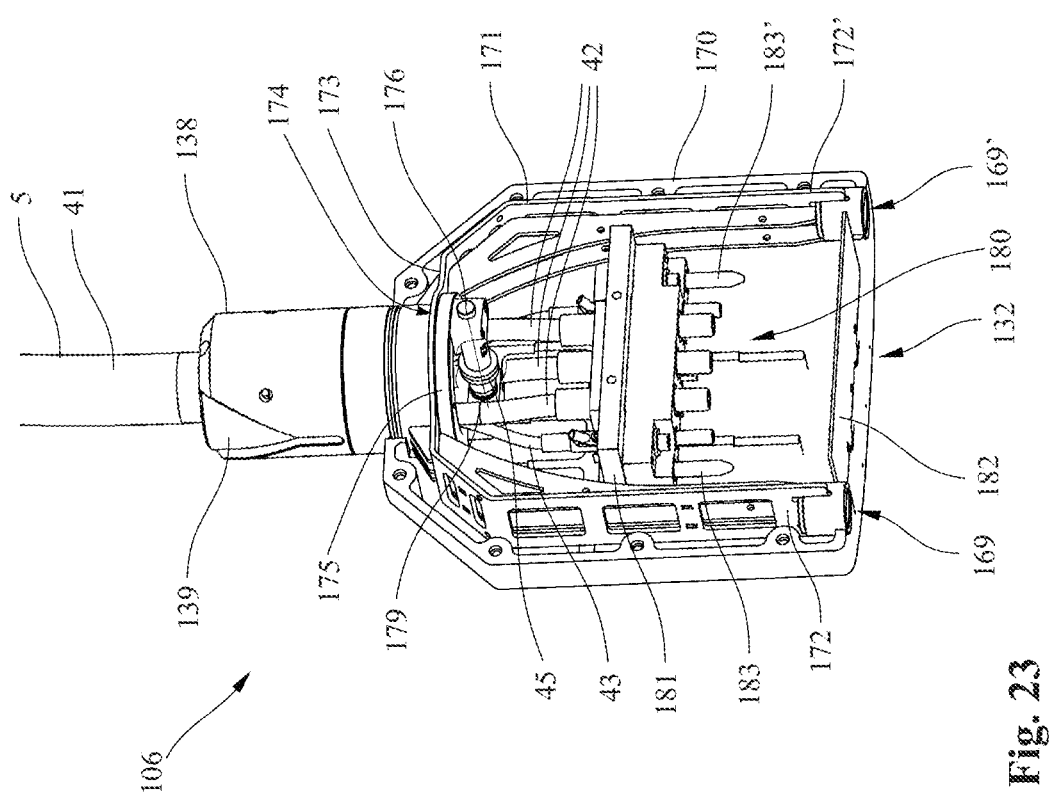
FIG. 23 a diagrammatic three-dimensional view of the connecting plug of FIG. 22 from a second diagonal side perspective.
Figure 26:
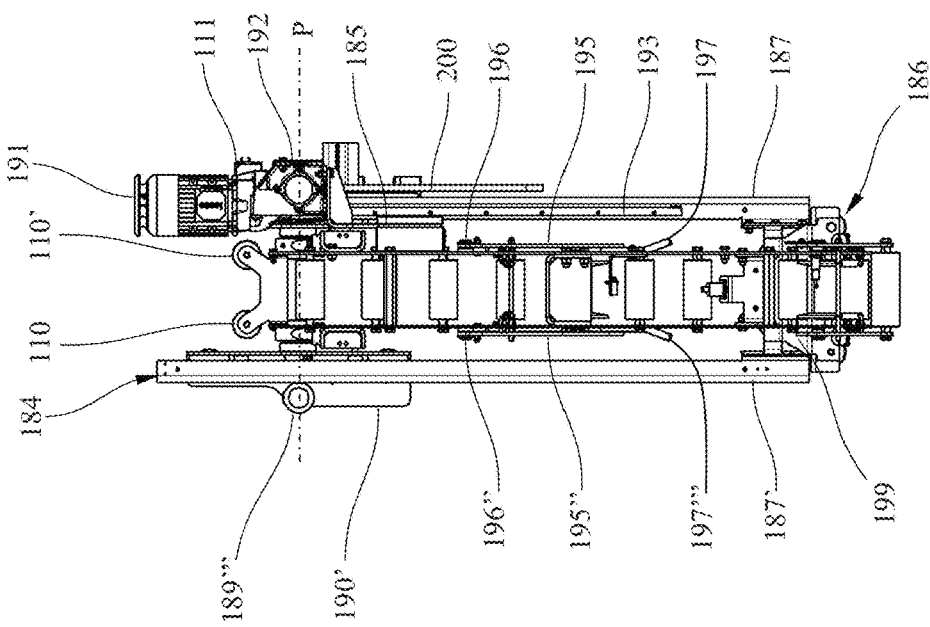
FIG. 26 a lateral view of the cable guiding device of FIG. 25 as seen on the left in FIG. 25.

In order to ensure that the supporting element 45 can serve as a tension relief mechanism, it is mounted, as described below, in the connecting plug 106 that, in FIGS. 22 to 24, is shown in detail in a partially disassembled state.

The connecting plug 106 comprises two plug jacketing halves, with only the plug jacketing half 170 being shown in FIGS. 22 and 23, whereas the other half has been removed so as to show the internal structure of the connecting plug 106.

Also provided is a substantially U-shaped supporting frame 171 made of a robust material, preferably of sheet steel, which frame, on its free leg ends 172, 172', has the above-mentioned latch opening 169, 169' in the form of oblong holes. The middle section 173 of the supporting frame 171, which connects the free leg ends 172, 172', has a circular opening 174, through which the gripping member 138 of the connecting plug 106 is inserted from below, as shown in FIGS. 22 and 23, with the gripping member substantially having the shape of a hollow cylinder. The circular-arc-shaped outer flange 175 of the gripping member 138 abuts the supporting frame 171 where it is mounted, for example, by means of screws or rivets.

To enable absorption of stresses in the longitudinal direction of the line cable 5, the tension relief mechanism 47 of the outer casing 41 can, on the one hand, be bracketed on the gripping member 138 and/or on the supporting frame 171 (not shown). On the other hand, a tensioning bolt 176 extending at right angles relative to the longitudinal direction of the line cable 5 is disposed on the circular outer flange 175 of the gripping member 138. The tensioning bolt 176 comprises an attachment means (not shown in the drawings) for the supporting element 45, more particularly a through-opening through which supporting element 45 is inserted. Disposed on the tensioning bolt 176 is a spring element, more particularly a spiral spring 177 that is optionally connected to an enclosing tensioning bolt sheath 178 to which one end of the supporting elements 45 can optionally be attached. To tension the supporting element 45, the tensioning bolt 176 is first pushed in its axial direction against the pressure of a spiral spring 177 disposed on a stepped end 178 of the tensioning bolt 176 out of an anti-slip means 179 shown in FIG. 22. Subsequently, the tensioning bolt 176 is turned a plurality of times in the winding direction so that the supporting element 45 is wound via a plurality of laps on the tensioning bolt 176. To prevent the supporting element 45 from unwinding under stress, the spiral spring 177 subsequently pushes the tensioning bolt 176 back into the anti-slip means 179 that is clearly visible in FIG. 22. Instead of the spiral spring 177, different spring elements can be used, e.g., cup springs, which, after tensioning the supporting element 45, push the tensioning bolt 176 reliably back into the anti-slip means 179. The anti-slip means 179 can preferably comprise a knurled inner bore that cooperates with the equally knurled end of the tensioning bolts 176.

In contrast, the various conductors 42 to 44 are routed unstressed through the circular opening 174 in the supporting frame 171 into the region between the free leg ends 172, 172 of the supporting frame 171, where they are electrically and mechanically connected to the mating male electrical connector elements 180 of the connecting plug 106. The individual male connector elements 180 are disposed on a connector support 181 that is stationarily retained in the longitudinal direction extending from the connecting plug opening 132 to the gripping member 138, i.e., also in the longitudinal direction of the line cable 5, and is freely floatingly mounted at right angles to this longitudinal direction.

To protect the male connector elements 180 against undesired contact and other external influences, the connecting plug opening 132 is covered by means of a protective cover 182. The protective cover 182 is retained by spring action in the closed position shown in FIGS. 21 and 22, but when the connecting plug 106 is placed onto the plug connector 114, it can be folded back by the force of the manipulator 118 to move into the area between the free leg ends 172, 172'.

To enable insertion of the male connector elements 180 of the connecting plug 106 into the mating female connector elements (not shown) of the plug connector 114, elongated centering bolts 183 having cone-shaped ends are disposed on the connector support 181, which centering bolts engage in mating the centering openings of the plug connector 114 (not shown).

FIG. 23 clearly shows the centering funnel 139 on the gripping member 138, the lower end of which centering funnel, in addition to the version shown in FIGS. 2 to 7, is lengthened in the shape of a slot to form a centering slot. Thus, via the centering pins 140 disposed in the feed-in opening 128 of the gripping device 127, the position of which pins is shown in the drawing, the connecting plug 106 can be very well aligned with the plug connector 114 as soon as it is gripped by the gripping device 127.

In addition, as an added function in the embodiment shown in FIG. 2, an alternative cable guiding device 107, details of which are shown in FIGS. 25 to 28, includes a pendulum swinging arm 184 to improve the guidance of the line cable 5 (not shown in FIGS. 8 to 20 and 25 to 28). Such pendulum swinging arms are basically known in the art, but the novel feature according to the invention is the possibility of linear movability, more particularly linear height adjustment, of the pendulum swinging arm 184. This serves to allow the pendulum swinging arm 184, which during travel of the crane 1 is completely in the lower position, to be moved completely into the upper position and out of the gripping space of the manipulator 118 for automatically grasping the connecting plug 106 by means of the manipulator 118 and to correctly position the connecting plug 106.

Figure 27:
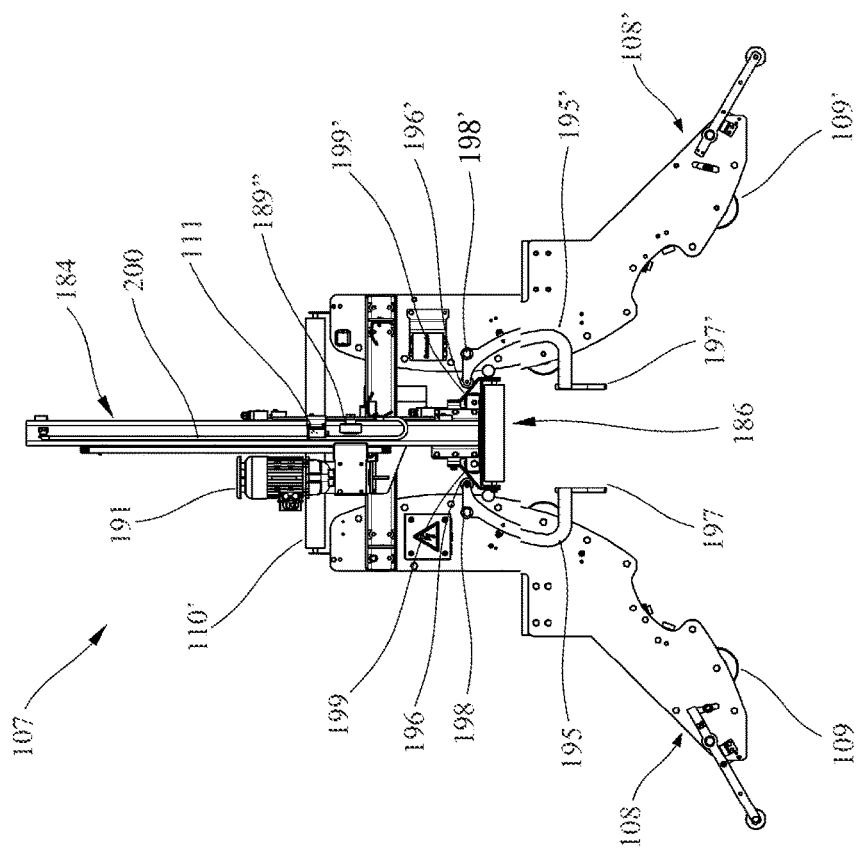
FIG. 27 a front view of the cable guiding device of FIG. 25 with the height-adjustable pendulum in a first lower position.

To this end, a pendulum retaining means 185 pivoting about a pendulum axis P that extends substantially horizontally and at right angles to the travel direction F of the crane 1 is disposed on the cable guiding device 107 so that the pendulum swinging arm 184 can swing back and forth about the pendulum axis P, as is clearly visible in FIG. 27.

Deflection of the pendulum swinging arm 184 from the vertical S is caused in a manner known in the art by the line cable 5 that, during travel of the crane 1, is being wound and unwound and that moves through a cable guide 186 disposed on the lower end of the pendulum swinging arm 184 and having longitudinal and transverse cable guide rolls. Using tautness and slackness sensors known in the art and here not further described, it is possible to detect whether the line cable 5 is guided tautly or slackly and subsequently, if necessary, to pull the line cable 5 in or pay it out. The line cable 5 is preferably guided by an additional cable guide disposed in the payout direction of the line cable 5 upstream of the cable guide 186 of the pendulum swinging arm 184, which additional cable guide is arranged between and/or on the upper end of the two roller bends 108, 108'. The cable guide can preferably be formed using the lateral guide rollers 110, 110', but other methods of guiding the line cable 5 can be used as well.

Figure 25:
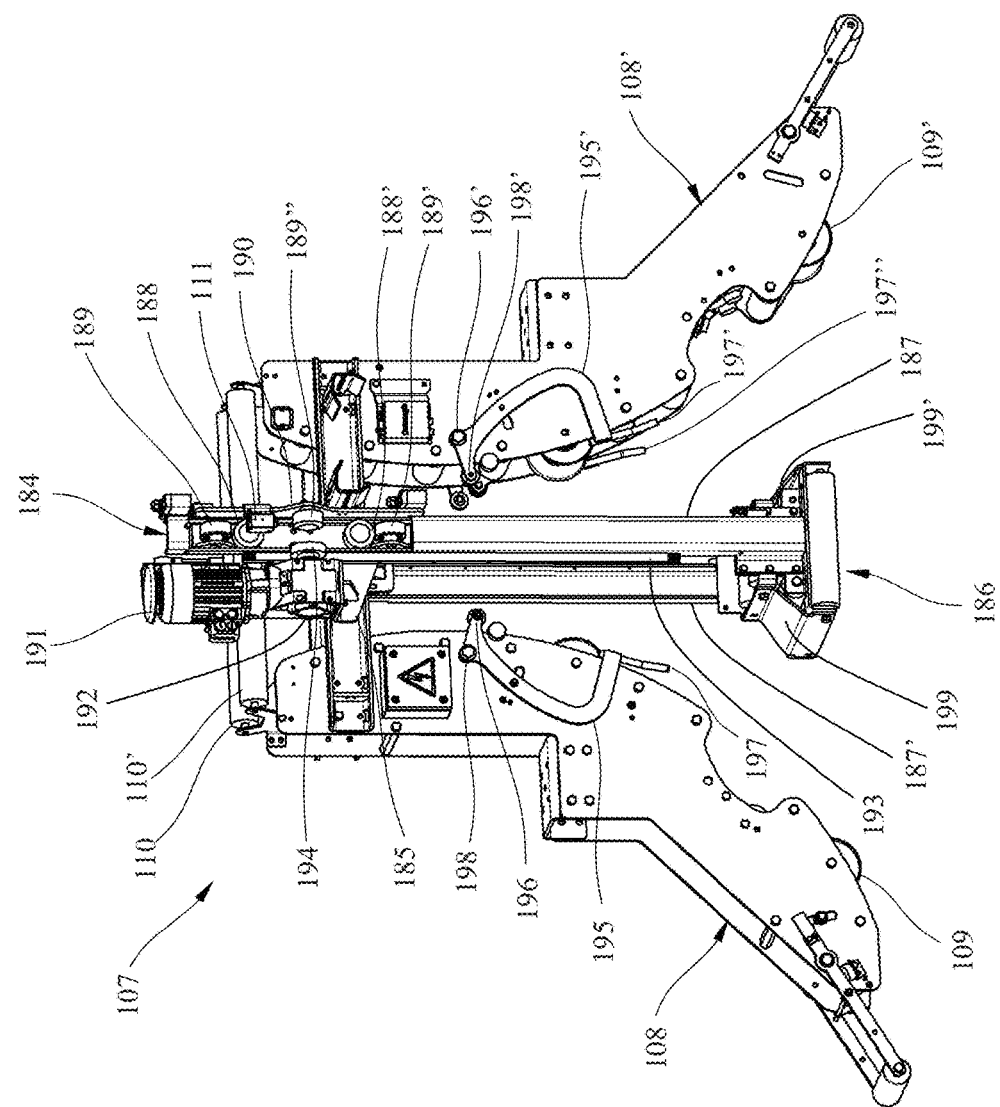
FIG. 25 a diagrammatic three-dimensional view of the cable guiding device of FIGS. 9 to 12.
Figure 28:
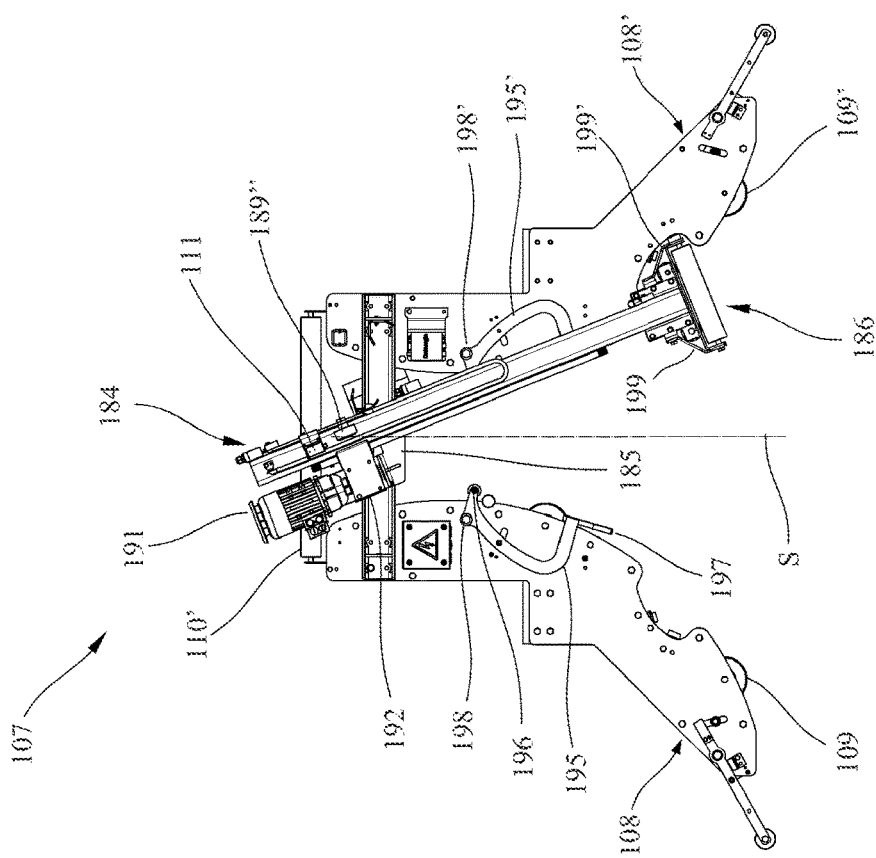
FIG. 28 a front view of the cable guiding device of FIG. 25 with the height-adjustable pendulum in a second lower position.

To enable movement of the pendulum swinging arm 184 back and forth between the uppermost and lowermost positions shown in FIGS. 25 and 28, the pendulum swinging arm 184 comprises two guide rails 187, 187', shown in a partially broken view in FIG. 25, which guide rails have a U-shaped cross-section, with their open sides facing each other. The guide rail 187 is guided by means of lateral guide rollers 188, 188' disposed on the pendulum retaining means 185, inside front-end guide rollers 189, 189' and an outside front-end guide roller 189" running on the outside of the middle leg of the guide rail 187. The guide rail 187 runs in parallel on the side of an angled guide plate 190 on which the outside front-end guide roller 189" is disposed. The guide rail 187' is similarly guided, with FIG. 26 clearly showing the guide plate 190' of the other guide rail 187' having the outside front-end guide roller 189''', which guide plate is disposed on the side of the cable guiding device 107 opposite the pendulum retaining means 185.

Also disposed on the pendulum retaining means 185 is a pendulum drive, which moves with the pendulum swinging arm 184 and which has an electric motor 191, a 90° gearbox 192, and a drive pinion 194 intermeshing with a toothed rack 193 disposed on the pendulum swinging arm 184. This allows the pendulum swinging arm 184 to be moved in its longitudinal direction by a motor toward and away from the pendulum retaining means 185. As an alternative, a direct linear drive or a toothed belt drive can be used to swing the pendulum swinging arm 184 in and out.

To enable accurate positioning of the connecting plug 106 for the gripping device 127 in the cable guiding device 107, the pendulum swinging arm 184 moves completely to the top, as shown in FIGS. 8 to 11 and 28. At the same time and afterwards, the connecting plug 106 is pulled via the line cable 5 completely upwardly to the cable guide 186 of the pendulum swinging arm 184.

To enable further improvement of the positioning of the connecting plug 106 for grasping by the manipulator 118 in the cable guiding device 107, oppositely lying retaining brackets 195, 195' are disposed on the roller bends 108, 108'.

The retaining brackets 195, 195' pivot about substantially horizontal axes of rotation 196, 196', which extend at right angles to the travel direction F and comprise downwardly extending rod-shaped retaining extensions 197, 197', 197", 197''', which, in the upper position shown in FIGS. 8 and 28, adjoin the connecting plug 106, thereby preventing the connecting plug 106 from twisting or moving aside while it is being grasped by the gripping device 127.

As a rule, the retaining brackets 195, 195' are retained by action of a spring in the open retracted position, as shown in FIGS. 12, 25, and 27, on the roller bends 108, 108'.

Only when the pendulum swinging arm 184 is moved into the upper retaining position shown in FIGS. 8 to 11 and 28 do the stop rollers 198, 198' on the upper, shorter lever arms of the retaining brackets 195, 195' strike against stops 199, 199' of the cable guide 186 so that the lower, longer, approximately L-shaped inwardly bent lever arms of the retaining brackets 195, 195' are moved toward each other and to the connecting plug 106. The retaining brackets 195, 195' can also have a different configuration; the only essential requirement is that, as the pendulum swinging arm 184 or possibly also the connecting plug 106 as such is started, the retaining brackets 195, 195' are moved to make contact with the connecting plug 106.

As indicated in FIG. 27, the cable guide stops 199, 199' also serve as actuating elements for the tautness sensors, which are here not further described, when the pendulum swinging arm 184 is pulled in its laterally completely deflected position.

Preferably, the above-described sensor 111 is here disposed on the pendulum swinging arm 184, where it is supplied with electricity via a cable carrier 200 and, in terms of data, technically connected to the control system of the crane. The sensor 111 can, however, also be disposed at a point of the cable guiding device 107 or even on the crane 1 and be connected to the control system without a cable.

Figure 30:
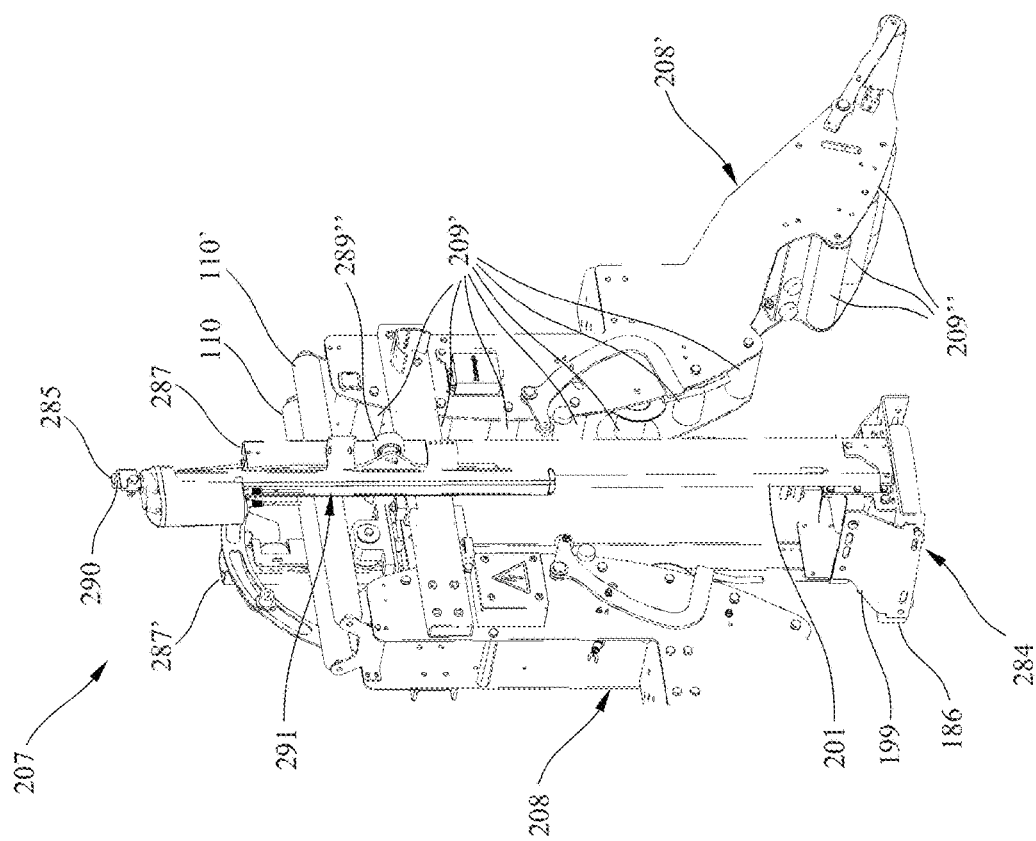
FIG. 30 a portion of a diagrammatic three-dimensional view of FIG. 29 from a different perspective.
Figure 29:
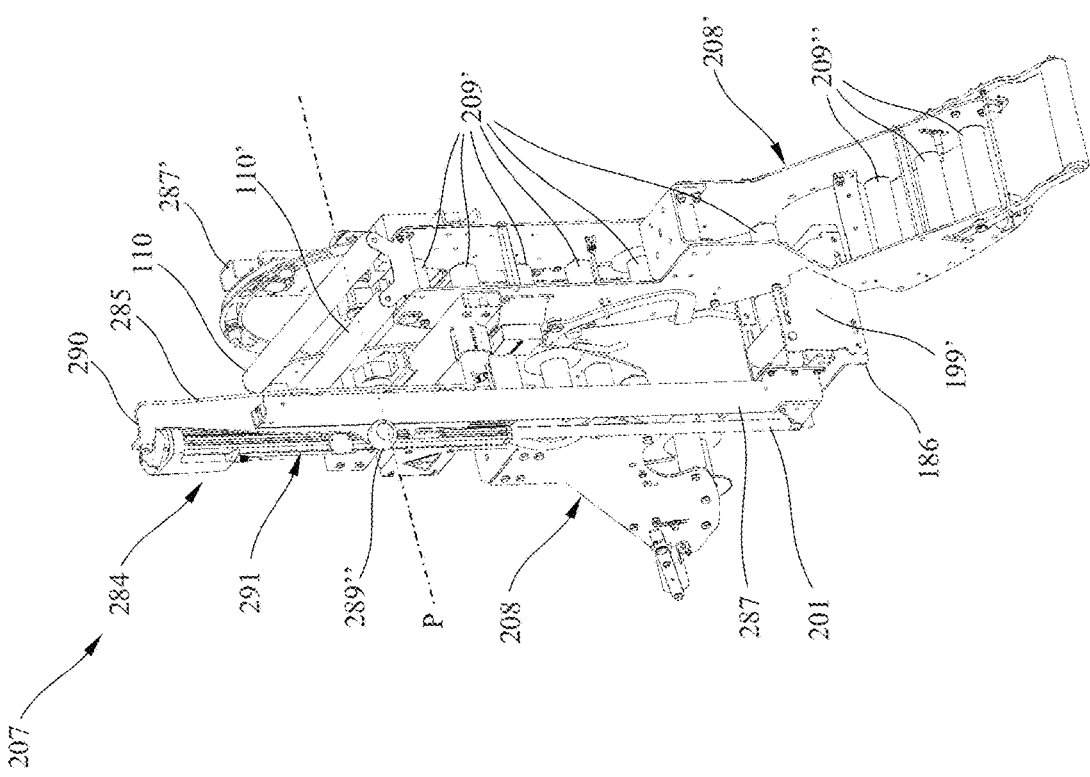
FIG. 29 a diagrammatic three-dimensional view of an alternative cable guiding device.

FIGS. 29 and 30 show an alternative configuration of a cable guiding device 207 that substantially differs in two aspects from the design shown in FIGS. 25 to 28, i.e., the design of the roller bends 208, 208' and the longitudinal guide rollers 209, 209', and 209", on the one hand, and an alternative drive 291 of the pendulum swinging arm 284. Therefore, identical reference characters, with the addition of "200," will again be used for the cable guiding device 207. Again, the focus is on the differences so that, unless otherwise specified, explanations relating to components in the first configuration according to FIGS. 2 to 7 and the second configuration according to FIGS. 8 to 28 equally apply to the configuration shown in FIGS. 29 and 30.

Here, the outer longitudinal guide rollers 209" in the outer, lower region of the roller bend 208' are wider than the inner longitudinal guide rollers 209' of the roller bend 208' disposed in the inner, upper region of the roller bend 108'. The advantage is that if the line cable 5 is paid out not completely parallel to the travel direction F of the crane 1, the line cable 5 can be laterally offset slightly more in the outer region of the roller bends 208, i.e., when looking at the cable guiding device 207 from above, the line cable 5 can be oriented slightly obliquely relative to the longitudinal direction of the roller bends 208'. To this end, the frame of the roller bend 208' on its outer, lower, outwardly facing end preferably has a greater distance between two oppositely lying walls, between which the longitudinal guide rollers 209" are mounted, than in the region of the inner, narrower longitudinal guide rollers 209'. The design of the second roller bend 208 is mirror inverted; in all other respects, the explanations relating to the roller bend 208' are analogous.

In addition, instead of the rotary electric motor 191 shown in FIGS. 25 to 28, a direct linear drive 291 is used to move the pendulum swinging arm 284 in the longitudinal direction. The pendulum retaining means 285 is slightly lengthened toward the top, as is the angled guide plate 290. The driving element of the linear drive 291 is preferably supported by the angled guide plate 290 and the pendulum retaining means 285, whereas a moving piston rod 201 of the linear drive 291 is mounted on the moving part of the pendulum swinging arm 284. The output end of the piston rod 201 can preferably be disposed on the lower end of the moving part of the pendulum swinging arm 284, as shown in FIGS. 29 and 30, specifically on a U-shaped guide rail 287. To start the pendulum swinging arm 284 swinging, the piston rod 201 is moved upwardly.

As described in detail above, using the connecting device 13, 113 according to the present invention, the connecting plug 6, 106 of the line cable 5 can be simply and automatically connected to the feed device 12, 112 without having to manually insert or remove the connecting plug 6, 106. Another aspect of the invention provides that, for the purpose of improving the automatic connecting procedure, the line cable 5 be specially configured. In addition, the connecting plug 6, 106 can also be specially configured in order to improve grasping with the manipulator 18, 118 and specifically the gripping device 27, 127. Also, to simplify automatic grasping of the line cable 5 and the connecting plug 106, a height-adjustable pendulum swinging arm 284 can be provided. According to another aspect of the invention, the line cable 5 can be guided so as to protect the cable.

The feed direction H preferably extends toward and away from the cable guiding device 7, 107, and 207 and the crane 1 and preferably at right angles relative to the travel direction F. In an embodiment (not shown), the manipulator 18 and 118 and/or the gripping device 27 and 127 can, however, additionally be moved in the travel direction F as well to adjust, if necessary, an offset in the travel direction F. The manipulator 18 and 118 and/or the gripping device 27 and 127 can also be designed to move about a vertical axis in order to better adjust an angular offset, e.g., in the case of an obliquely positioned guiding device 7, 107, and 207.

LIST OF REFERENCE CHARACTERS

1 Container crane (E-RTG)
2 Container
3, 3' Wheels
4 Cable drum
5 Line cable
6; 106 Connecting plug
7; 107; 207 Cable guiding device
8, 8'; 108, 108'; 208, 208' Roller bend
9, 9'; 109, 109'; 209, 209', 209" Longitudinal guide rollers
10, 10'; 110, 110' Lateral guide rollers
11; 111 Sensor unit
12; 112 Feed device
13; 113 Connecting device
14, 14', 14"; 114, 114', 114" Plug connectors
15, 15'; 115, 115', 115" Connecting member (swivel plate)
16, 16'; 116 Bearing for the connecting member
17; 117 Mounting plate
18; 118 Manipulator
19 Manipulator base
20 Lower manipulator arm
21, 21', 21" Lower sub-arms
22 Lower manipulator drive
23 Cross-shaped connecting piece
24 Upper manipulator arm
25, 25' Upper sub-arms
26 Upper manipulator drive
27; 127 Gripping device
28; 128 Funnel-shaped feed opening
29; 129 Signal mast
30; 130 Identification plate
31 Signal light
32; 132 Connecting plug opening
33, 33' Connector housing
34, 34' Cover
35, 35' Hinges for the cover
36, 36' Opening tabs for the cover
37, 37' Stop for the swivel plate
38; 138 Gripping member, connecting plug
39; 139 Centering funnel
40; 140 Centering pins
41 Outer casing
42 Phase conductor
43 Protective conductor
44 Data transmission conductor
45 Supporting element
46 Filling material, molded parts
47 Tension relief mechanism
148 Control cabinet
149 Power supply and data cable
150, 150', 150" Cable ducts
151 Legs
152 Boom
153 Central section, identification plate
154, 154' Bracket-like sections, identification plate
155 Foundation
156 Pit
157, 157', 157" First movable protective enclosures
158, 158', 158", 158''' Side wall, front wall, opening in $1^{st}$ protective enclosure
159, 159', 159" Second rigid protective enclosures
160, 160', 160", 160''' Side walls, front wall, opening in $2^{nd}$ protective enclosure
161, 161' Centering bracket
162, 162' Vertical guide section, centering bracket
163, 163' Slanted feed-in section, centering bracket
164, 164', 164" Plug latching mechanism
165, 165', 165" Latching bolt
165a, 165a', 165a" Latching bolt
166, 166', 166" Elongated latching bolt
167, 167', 167" Latching drive mechanism
168, 168', 168" Lever assembly
169, 169' Elongated latch openings
170 Plug jacketing half
171 U-shaped supporting frame
172, 172' Leg ends
173 Supporting frame, middle section
174 Circular opening supporting frame
175 Outer flange gripping member
176 Tensioning bolt
177 Spiral spring
178 Stepped end of the tensioning bolt
179 Anti-slip means
180 Male connector elements, connecting plug
181 Connector support
182 Protective cover
183 Elongated centering bolts
184; 284 Pendulum swinging arm
185; 285 Pendulum retaining means
186 Cable guide
187, 187'; 287, 287' U-shaped guide rails 188, 188' Lateral guide rollers
189, 189', 189", 189'''; 289" Inside and outside front-end guide rollers
190, 190'; 290 Angled guide plate
191; 291 Electric motor (rotary), linear drive
192 90°-gearbox
193 Toothed rack
194 Drive pinion
195, 195' Retaining bracket
196, 196' Retaining bracket, axes of rotation
197, 197' Retaining extensions
198, 198' Stop rollers
199, 199' Cable guide stops
200 Cable carrier
201 Piston rod, linear drive
D Horizontal axis of rotation, connecting member
F Travel direction, crane
H Horizontal feed direction, manipulator
P Pendulum axis, pendulum swinging arm
S Vertical of the pendulum swinging arm
V Vertical feed direction, manipulator

The invention claimed is:

1. A line cable having one or more conductors for transmitting at least one of electrical power and data; and an elongated supporting element, wherein a connecting element for connection to a connector of a feed device for the at least one of electrical power and data is disposed at one end of the line cable, wherein the supporting element is connectable to the connecting element in a force-fitting and/or interlocking manner for transmitting longitudinal tensile forces and wherein the supporting element is attached to a tensioning bolt tensioning the supporting elements and pivotably mounted on the connecting element about an axis of rotation extending in a longitudinal direction of the supporting element.

2. The line cable of claim 1, wherein the connecting element comprises a supporting frame that is connectable in a force-fitting and/or interlocking manner to the supporting element.

3. The line cable of claim 2, wherein the supporting frame is connectable to the connector in a force-fitting and/or interlocking and detachable manner.

4. The line cable of claim 1, wherein the connecting element comprises an anti-slip mechanism for securing the tensioning bolt.

5. The line cable of claim 4, wherein the tensioning bolt is movable in an axial direction against a spiral spring out of the anti-slip mechanism.

6. The line cable of claim 1, wherein the connecting element comprises latching elements for the detachable interlocking and/or force-fitting connection to mating latching counter-elements disposed on the connector.

7. The line cable of claim 1, wherein the one or more conductors of the line cable are connected in a strain-relieved or strain-free manner to connectors disposed in the connecting element.

8. The line cable of claim 7, wherein the connectors are floatingly mounted in at least one direction inside the connecting element.

9. The line cable of claim 7, wherein the connectors are disposed on a connector support.

10. The line cable of claim 1, wherein the connecting element comprises a connecting plug opening for receiving the connector.

11. The line cable of claim 10, wherein an automatically closing protective cover is disposed on the connecting element for closing the connecting plug opening.

12. The line cable of claim 1, wherein centering elements for cooperation with mating centering counter-elements of the connector are disposed on the connecting element.

13. The line cable of claim 1, wherein a gripping space for a gripping device is disposed on the connecting element.

14. The line cable of claim 13, wherein the gripping space comprises at least one centering funnel for at least one centering element of the gripping device or the gripping device comprises at least one centering funnel for at least one centering element of the gripping space.

15. The line cable of claim 14, wherein the centering funnel on a narrower end is lengthened in the shape of a slot to form a centering slot.

16. A power supply system for supplying at least one of electrical energy and data by cables to a movable electrical load, the power supply system comprising at least one feed device and a connecting element, which is connectable to said feed device, of the line cable of claim 1, wherein the line cable can be paid out and retrieved from a reservoir that is carried along by the load depending on a distance between the reservoir and the feed device.

17. The power supply system of claim 16, wherein the reservoir is a motor-driven cable drum.

18. The power supply system of claim 16, wherein the line cable is paid out from the top to the bottom.

19. The power supply system of claim 16, further comprising a plug latching mechanism for latching the connecting element to the connector.

20. The power supply system of claim 18, further comprising a connecting device for connecting the connecting element of the line cable to a connector of the feed device.

* * * * *